United States Patent
Felt et al.

(10) Patent No.: US 9,794,786 B2
(45) Date of Patent: Oct. 17, 2017

(54) MOBILE WIRELESS COMMUNICATION DEVICE ACTIVATION SYSTEMS AND METHODS

(71) Applicant: Verizon Patent and Licensing Inc., Arlington, VA (US)

(72) Inventors: Michelle Felt, Warren, NJ (US); Thomas Michael McGurl, Red Bank, NJ (US); Sankar Shanmugam, Dayton, NJ (US); Nagaraju Manchiraju, Bridgewater, NJ (US); Shankar Arumugavelu, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 14/864,836

(22) Filed: Sep. 24, 2015

(65) Prior Publication Data

US 2017/0094508 A1    Mar. 30, 2017

(51) Int. Cl.
*H04W 12/06* (2009.01)
*H04L 29/06* (2006.01)

(52) U.S. Cl.
CPC ......... *H04W 12/06* (2013.01); *H04L 65/1069* (2013.01)

(58) Field of Classification Search
CPC ..... H04W 8/265; H04W 92/24; H04W 12/06; H04W 88/18
USPC ...... 455/410, 411, 414.1; 370/329, 332, 338
See application file for complete search history.

(56) References Cited

U.S. PATENT DOCUMENTS

| | | | |
|---|---|---|---|
| 6,188,899 B1 * | 2/2001 | Chatterjee | H04W 8/265 455/435.1 |
| 2001/0019604 A1 * | 9/2001 | Joyce | G06Q 20/00 379/114.2 |

* cited by examiner

*Primary Examiner* — Sam Bhattacharya

(57) ABSTRACT

An exemplary mobile device activation system may receive, by way of a mobile device not currently activated on a mobile network, a request to initiate an activation process to activate the mobile device on the mobile network, authenticate the mobile device to a user account associated with the mobile network, establish an activation session between the authenticated mobile device and the user account, provide, during the activation session, an interactive activation flow by way of the authenticated mobile device, and activate the mobile device on the mobile network based on user interaction with the interactive activation flow by way of the mobile device.

20 Claims, 22 Drawing Sheets

MOBILE WIRELESS COMMUNICATION DEVICE ACTIVATION SYSTEMS AND METHODS

BACKGROUND INFORMATION

A provider of a mobile wireless communication service typically requires a mobile wireless communication device ("mobile device") to be activated on a mobile wireless communication network ("mobile network") before the mobile device is allowed to send and receive communications over the mobile network. Consequently, when a person purchases and wants to activate a new mobile device on such a mobile network, he or she conventionally enlists the help of a representative of the service provider by calling a customer service number or by visiting a retail location of the service provider. The representative then works with the person to activate the new mobile device on the mobile network.

While such a conventional activation process is an effective way to activate a mobile device on a mobile network, there are shortcomings to the process. As an example, certain conventional processes tightly couple the activation of the mobile device to the purchase of the mobile device and often require a purchaser to go through a comprehensive and lengthy process of purchasing the mobile device, selecting service plan options for the mobile device, and activating the mobile device at one time (e.g., during a visit to a retail store). This tight coupling makes it difficult to separate the activation of the mobile device from the purchase of the mobile device, even when the purchaser wants to conveniently purchase the mobile device at one time or place and activate the mobile device at a different time or place that is more convenient (e.g., such as may happen when the purchaser wants to gift the mobile device to another person). As another example, certain conventional activation processes require a device other than the purchased new mobile device, such as a customer service representative's device, to be used to activate the new mobile device on the network. As another example, certain conventional activation processes require significant communications between a representative of the service provider and the purchaser of the mobile device in order for the representative to manually obtain and input information needed for activation, which process is prone to error and lengthens the activation process. As another example, certain conventional activation processes require the service provider to commit significant resources, such as equipment and/or human resources, to support the activation process.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
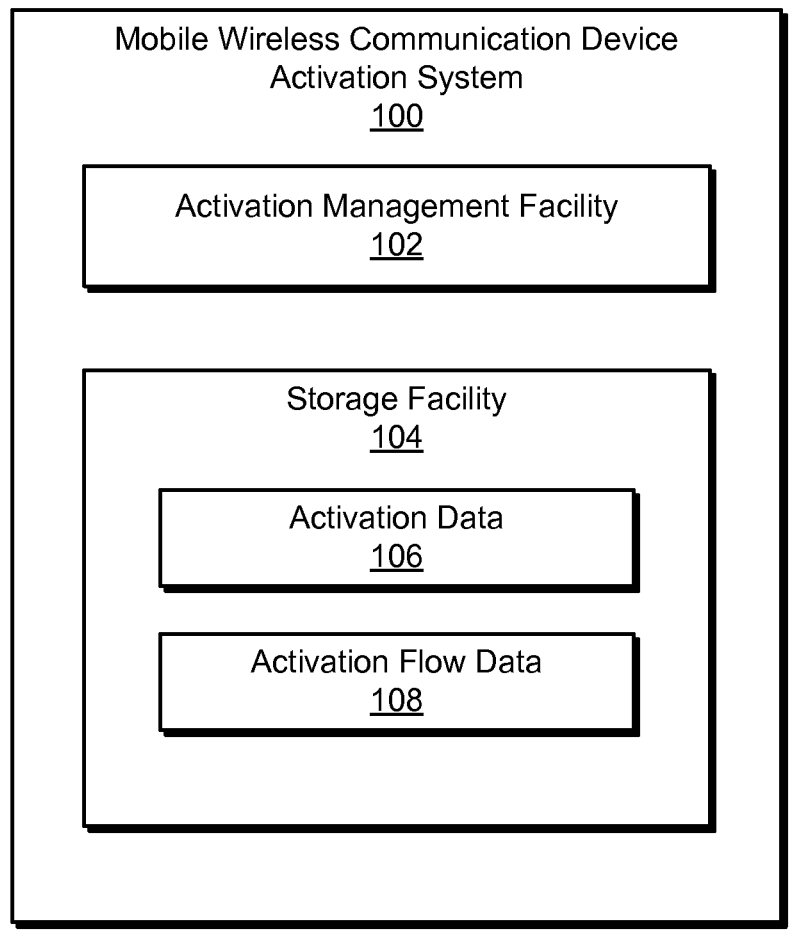
FIG. 1 illustrates an exemplary mobile wireless communication device activation system according to principles described herein.

Exemplary mobile wireless communication device activation systems and methods are described herein. Exemplary systems and methods described herein may facilitate activation of a mobile wireless communication device ("mobile device") on a mobile wireless communication network ("mobile network"). For example, certain systems and methods described herein may allow a mobile device that is not currently activated on a mobile network to be used to activate the mobile device on the mobile network. To this end, systems and methods described herein may provide one or more activation processes by way of the non-activated mobile device and for use by a user of the mobile device to facilitate activation of the mobile device on the mobile network.

To illustrate one example, an activation system may receive, by way of a mobile device not currently activated on a mobile network, a request to initiate an activation process to activate the mobile device on the mobile network, authenticate the mobile device to a user account associated with the mobile network, establish an activation session between the authenticated mobile device and the user account, provide, during the activation session, an interactive activation flow by way of the authenticated mobile device, and activate the mobile device on the mobile network in association with the user account based on user interaction with the interactive activation flow by way of the mobile device.

As used herein, a mobile wireless communication network (or simply a mobile network) may include any network that provides a mobile wireless communication device that is activated on the network with mobile, wireless interconnectivity over the network. For example, a mobile network may include one or more cellular telephone and/or data networks such as a mobile phone network (e.g., a 2G, 3G, 4G, or other mobile phone network). The mobile network may use any suitable technologies for mobile, wireless communications, including but not limited to Global System for Mobile Communications ("GSM") technologies, Code Division Multiple Access ("CDMA") technologies, Time Division Multiple Access ("TDMA") technologies, and Long-Term Evolution ("LTE") technologies. A mobile network may be operated by a provider of a mobile wireless communication service ("service provider").

Various benefits may be realized in accordance with the methods and systems described herein. As an example, activation of a mobile device on a mobile network may be decoupled from, or less tightly coupled to, purchase of the mobile device, which may provide a user of the mobile device with flexibility and/or convenience in activating the mobile device on the mobile network. For instance, a person may be able to quickly purchase a mobile phone at a retail location (e.g., at a service provider store or at a vending kiosk at an airport or other location) and subsequently activate the mobile phone at a convenient time and/or location. Additionally or alternatively, a person may be able to purchase and gift a mobile device to a recipient, and the recipient may subsequently activate the mobile phone at a convenient time and/or location. As another example, a mobile device that is not currently activated on a mobile network (e.g., a newly purchased mobile device not yet activated on a mobile network) may be used to activate the mobile device on the mobile network, which may eliminate the need for another device to be used to activate the mobile device on the mobile network. As another example, a mobile device may be activated without help from a representative of a service provider. When compared to conventional activation processes, systems and methods described herein may reduce the amount of resources (e.g., equipment and/or human resources) that a service provider must commit to support activation of mobile devices, may reduce the chance of errors occurring during activation of mobile devices, and/or may provide increased convenience and/or flexibility in activation processes. These and/or additional or alternative benefits that may be provided by exemplary methods and systems described herein will be made apparent by the following description.

Examples of mobile wireless communication device activation systems and methods will now be described in reference to the accompanying drawings.

FIG. 1 illustrates an exemplary mobile wireless communication device activation system 100 ("system 100"). As shown, system 100 may include, without limitation, an activation management facility 102 and a storage facility 104 selectively and communicatively coupled to one another. It will be recognized that although facilities 102 and 104 are shown to be separate facilities in FIG. 1, any of facilities 102 and 104 may be combined into fewer facilities, such as into a single facility, or divided into more facilities as may serve a particular implementation. Additionally or alternatively, one or more of the facilities 102 and 104 may be omitted from and external to system 100 in other implementations. For example, storage facility 104 may be external of and communicatively coupled to system 100 in certain alternative implementations. Facilities 102 and 104 of system 100 may include or be otherwise implemented by one or more physical computing devices specifically configured to perform one or more of the operations described herein. In such implementations, system 100 may be referred to as a computer-implemented system 100.

Storage facility 104 may be configured to store data generated and/or used by activation management facility 102. For example, storage facility 104 may store activation data 106 representative of information used and/or generated by activation management facility 102 in an activation process and activation flow data 108 representative of an interactive activation flow that may be provided by activation management facility 102 as part of an activation process. Examples of data associated with an activation process that may be stored as activation data 106 and data associated with an activation flow that may be stored as activation flow data 108 are described herein. Storage facility 104 may store additional or alternative data as may serve a particular implementation.

Data stored by storage facility 104 may be accessed by system 100 from any suitable source, including a source internal or external to system 100. Thus, while storage facility 104 is shown to be within system 100 in FIG. 1, in alternative embodiments, storage facility 104 may be external of system 100.

Storage facility 104 may permanently or temporarily store data. In certain examples, system 100 may access certain data from a source external to system 100 and temporarily store the data in storage facility 104 for use by activation management facility 102. In certain examples, data generated by activation management facility 102 may be stored permanently or temporarily to storage facility 104.

Activation management facility 102 may perform one or more operations to activate a mobile device on a mobile network. For example, activation management facility 102 may receive, by way of a mobile device not currently activated on a mobile network, a request to initiate an activation process to activate the mobile device on the mobile network, authenticate the mobile device to a user account associated with the mobile network, establish an activation session between the authenticated mobile device and the user account, provide, during the activation session, an interactive activation flow by way of the authenticated mobile device, and activate the mobile device on the mobile network in association with the user account based on user interaction with the interactive activation flow by way of the mobile device. Examples of such operations will now be described with reference to an exemplary implementation of system 100.

Figure 2:
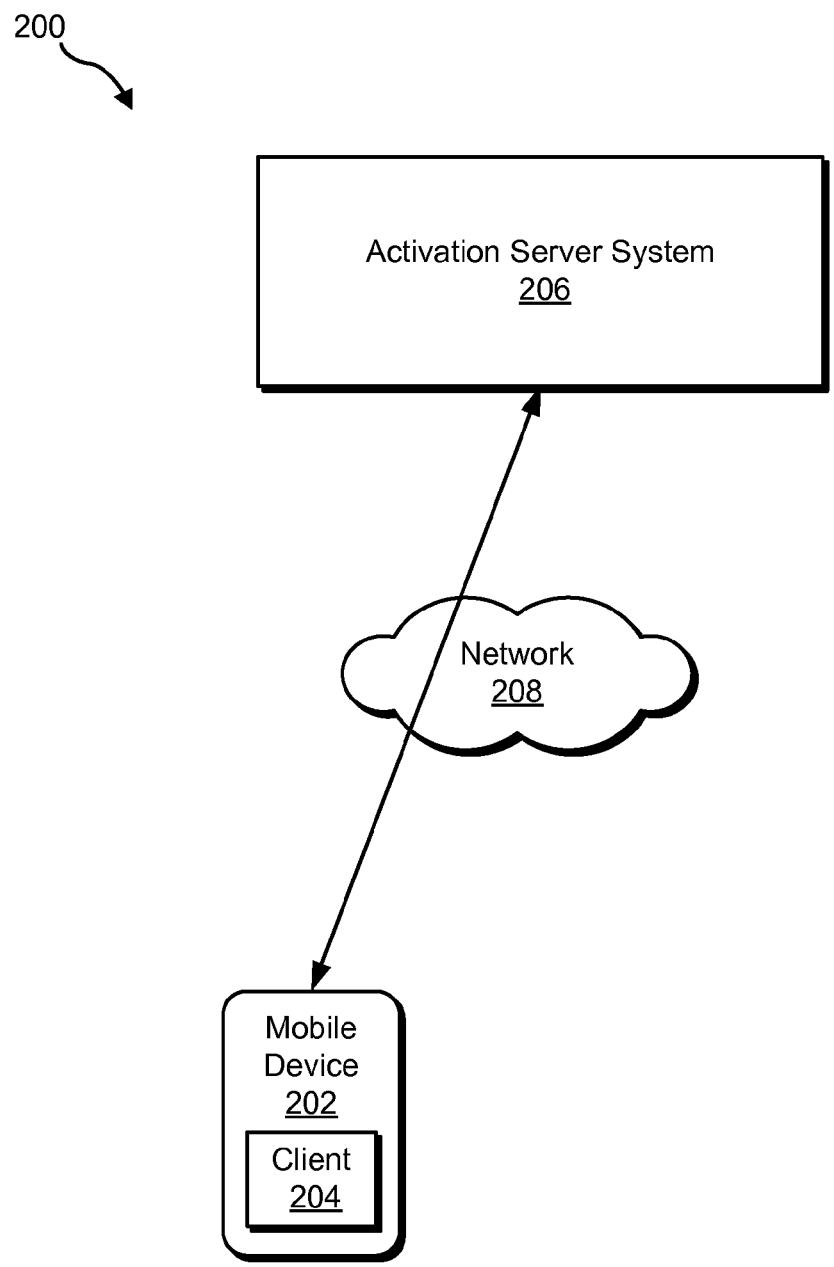
FIG. 2 illustrates an exemplary implementation of the system of FIG. 1 according to principles described herein.

FIG. 2 illustrates an exemplary implementation 200 of system 100. As shown, implementation 200 may include a mobile device 202, a client 204 implemented by mobile device 202, and an activation server system 206 communicatively coupled to mobile device 202 by way of a network 208.

System 100 may be implemented in implementation 200 in any suitable way. For example, components of activation system 100 (e.g., activation management facility 102 or a portion of activation management facility 102) may be implemented entirely by client 204, entirely by activation server system 206, or distributed across client 204 and activation server system 206. Accordingly, one or more operations of system 100 described herein may be performed entirely by client 204, entirely by activation server system 206, or by a combination of client 204 and activation server system 206.

Mobile device 202 may include any wireless communication device configured to, or that may be configured to, communicate wirelessly over a mobile network. For example, mobile device 202 may include a mobile phone, a smart phone, a tablet computer, a laptop computer, or any other device equipped to send and/or receive wireless communications over a mobile network. To this end, mobile device 202 may be equipped with one or more radio transceivers, antennae, and/or other wireless communications devices configured to support sending and/or receiving of wireless communications over the mobile network.

Client 204 may include any software, firmware, client application, or other computing code installed on mobile device 202 and configured to be executed by mobile device 202 to direct mobile device 202 to perform one or more client-side operations of system 100. For example, client 204 may include a client application pre-loaded on mobile device 202 prior to a retail sale of mobile device 202 to an end user, a client application installed on mobile device 202 after the retail sale of mobile device 202 to the end user, computing code integrated within a native setup process of mobile device 202, an address for activation server system 206 that may be used by mobile device 202 to initiate communications with activation server system 206, or any other computing code and/or data implemented by mobile device 204. Examples of client-side operations of system 100 that may be performed by client 204 are described herein.

Activation server system 206 may include any suitable configuration of computing devices operated by a provider of a mobile network and configured to perform one or more server-side operations of system 100. For example, activation server system 206 may include an activation gateway device configured to communicate with mobile device 202 by way of network 208 when mobile device 202 is not activated on the mobile network. In addition, activation server system 206 may include or communicate with one or more servers and/or databases configured to perform one or more other server-side operations to activate mobile device 202. Examples of such operations are described herein.

Mobile device 202 and activation server system 206 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, GSM technologies, CDMA technologies, TDMA technologies, LTE technologies, Short Message Service ("SMS"), Multimedia Message Service ("MMS"), radio frequency ("RF") signaling technologies, wireless communication technologies, Internet communication technologies, and other suitable communications technologies.

In certain embodiments, mobile device 202 and activation server system 206 may communicate via network 208, as shown in FIG. 2. Network 208 may include one or more networks, such as one or more wireless networks (Wi-Fi networks), wireless communication networks, mobile networks (e.g., cellular telephone and/or data networks), wide area networks (e.g., the Internet), local area networks, and any other networks capable of carrying data and/or communications signals between mobile device 202 and activation server system 206. Communications between mobile device 202 and activation server system 206 may be transported using any one of the above-listed networks, or any combination or sub-combination of the above-listed networks. Alternatively, mobile device 202 and activation server system 206 may communicate in another way such as by direct wireless connections between user computing mobile device 202 and activation server system 206.

In certain examples, network 208 may include a mobile network on which mobile device 202 is not currently activated. For example, mobile device 202 may be newly purchased and not yet activated on the mobile network. Activation server system 206 may be configured to send and receive communications to/from mobile device 202 over the mobile network even when mobile device 202 is not activated on the mobile network. For example, activation server system 206 may include an activation gateway device configured to participate in such communications with non-activated mobile device 202. This may allow mobile device 202 to be used to communicate with activation server system 206 over the mobile network in order to activate mobile device 202 on the mobile network. Alternative to communicating with activation server system 206 over the mobile network in order to activate mobile device 202 on the mobile network, mobile device 202 may communicate with activation server system 206 over another network connection across network 208 (e.g., a Wi-Fi and Internet connection) in order to activate mobile device 202 on the mobile network.

Activation management facility 102 of system 100 may receive, by way of mobile device 202 that is not currently activated on a mobile network, a request to initiate an activation process to activate mobile device 202 on the mobile network. Activation management facility 102 may receive the request by way of mobile device 202 in any suitable way. For example, client 204 may receive the request from one or more components of mobile device 202, from a user of mobile device 202 (e.g., in response to user input provided by the user to client 204), and/or by detecting an occurrence of a predetermined trigger event (e.g., an initial power-on of mobile device 202, reception of specific user input during setup of mobile device 202, etc.). Additionally or alternatively, activation server system 206 may receive data representative of the request from mobile device 202 (e.g., in a communication transmitted by mobile device 202 to activation server system 206 by way of network 208).

To illustrate, mobile device 202 may be purchased in any suitable way and/or from any suitable source. Subsequently, at any suitable time and/or location, a user of mobile device 202 may unbox and power on mobile device 202. If client 204 has been preloaded on mobile device 202 (e.g., as a pre-loaded application or as part of a pre-loaded device setup process), client 204 may receive a request to initiate an activation process to activate mobile device 202 by detecting an initial power-on of mobile device 202, execution of one or more setup processes by mobile device 202, and/or user input received during execution of one or more setup processes by mobile device 202 (e.g., user input provided by the user to instruct mobile device 202 to initiate an activation process to activate mobile device 202). If client 204 has not been preloaded on mobile device 202, after power-on of mobile device 202 and an execution of a native device setup process, the user of mobile device 202 may install and run client 204 on mobile device 202, and client 204 may receive a request to initiate an activation process to activate mobile device 202 by detecting an initial execution of client 204 and/or by receiving user input provided by the user during execution of client 204 to instruct mobile device 202 to initiate an activation process to activate mobile device 202.

In response to client 204 receiving a request to initiate an activation process to activate mobile device 202, client 204 may direct mobile device 202 to transmit data representative of the request to activation server system 206 by way of network 208. For example, client 204 may direct mobile device 202 to transmit an activation process initiation request message to a network address of an element (e.g., an activation gateway device) of activation server system 202. The message may include any data representative of a request from mobile device 202 to initiate an activation process to activate mobile device 202 on the mobile network. Activation server system 206 may receive the request in any suitable way and may perform one or more server-side operations of system 100 described herein in response to receiving the request.

Activation management facility 102 of system 100 may authenticate mobile device 202 to a user account associated with the mobile network. The user account may be maintained by a provider of the mobile network and may include any information related to an existing or new account of a customer of the provider. For example, the user account may include authentication credentials (e.g., login information such as an account identifier and password), subscription information, service plan information (e.g., data plan information), service usage information, pricing information, payment information, customer information, device information for any mobile devices activated on the mobile network in association with the user account, and any other account information. In certain examples, activation server system 206 maintains or has access to data representative of user accounts associated with the mobile network.

Activation management facility 102 may authenticate mobile device 202 to a user account associated with the mobile network in any suitable way. For example, in response to a request to initiate an activation process to activate mobile device 202 on the mobile network, activation server system 206 may send an authentication request to the mobile device 202 by way of network 208. Client 204 of mobile device 202 may receive the authentication request and direct mobile device 202 to perform one or more operations responsive to the authentication request. For instance, client 204 may direct mobile device 202 to prompt the user of mobile device 202 to provide authentication information. In certain examples, the prompt may be provided by client 204 directing mobile device 202 to display a graphical user interface "GUI" view that includes user interface content that prompts the user to provide authentication information.

Figure 3:
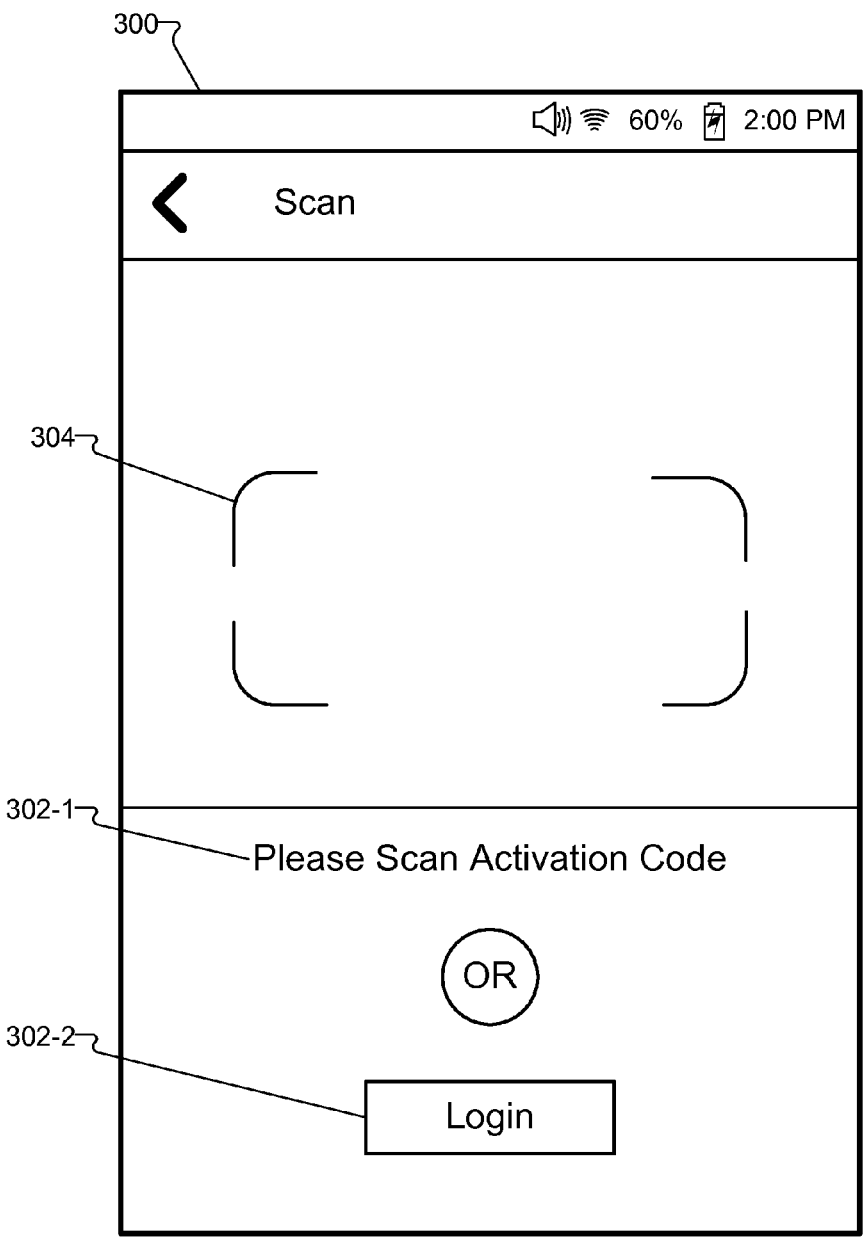
FIG. 3 illustrates an exemplary graphical user interface view according to principles described herein.

To illustrate, FIG. 3 shows an exemplary GUI view 300 that may be displayed on a display screen of mobile device 202. As shown, GUI view 300 may indicate options 302 (e.g., options 302-1 and 302-2) for authenticating to a user account associated with the mobile network. Option 302-1 indicates that the user may authenticate mobile device 202 to a user account associated with the mobile network by scanning an activation code into a scan area 304 of GUI view 300, and option 302-1 indicates that the user may authentication mobile device 202 to a user account associated with the mobile network by logging in to the user account. Examples of using these options to authenticate mobile device 202 will now be described.

In certain examples, a user may purchase mobile device 202 in a manner that allows the user to receive an activation code in conjunction with the purchase of mobile device 202. For example, the user may purchase mobile device 202 from a provider of the mobile network, such as from an online or a brick-and-mortar storefront operated by and/or affiliated with the mobile network provider. In conjunction with the purchase, the mobile network provider may generate and provide an activation code to the user in any suitable way. For example, the activation code may be printed on a physical or a digital purchase receipt provided to the user.

The activation code may represent any information about mobile device 202 and/or the purchase of mobile device 202 by the user. For example, the activation code may indicate a user account of the user with the mobile network provider. To illustrate, the user may have an existing account with the mobile network provider, and the account may be identifiable with an account identifier such as a mobile directory number ("MDN") or a mobile telephone number ("MTN") associated with the account. When the user purchases mobile device 202, the purchase may be linked to the user account in any suitable way, such as by the user providing the MDN or MTN associated with the account in conjunction with the purchase. The mobile network provider may then associate the user account with the purchase of mobile device 202 and generate an activation code that represents the association between the account and the purchase of mobile device 202.

In certain examples, the activation code may represent information about mobile device 202. For example, the activation code may represent one or more device identifiers, such as an International Mobile Station Equipment Identity ("IMEI"), a Mobile Equipment Identifier ("MEI"), a serial number (e.g., Electronic Serial Number ("ESN")), a model number, or another identifier of mobile device 202. As another example, the activation code may represent one or more subscriber identity module ("SIM") card identifiers for a SIM card associated with mobile device 202, such as an Integrated Circuit Card Identifier ("ICCID") and/or an International Mobile Subscriber Identity ("IMSI") of the SIM card associated with mobile device 202.

The activation code may be generated in any suitable form. For example, the activation code may include a visually scannable code that can be captured by a camera of mobile device 202. For instance, the activation code may include a bar code, a Quick Response ("QR") code, an alpha-numeric code, a numeric code, text, any other scannable code, or a combination or sub-combination thereof.

Figure 4:
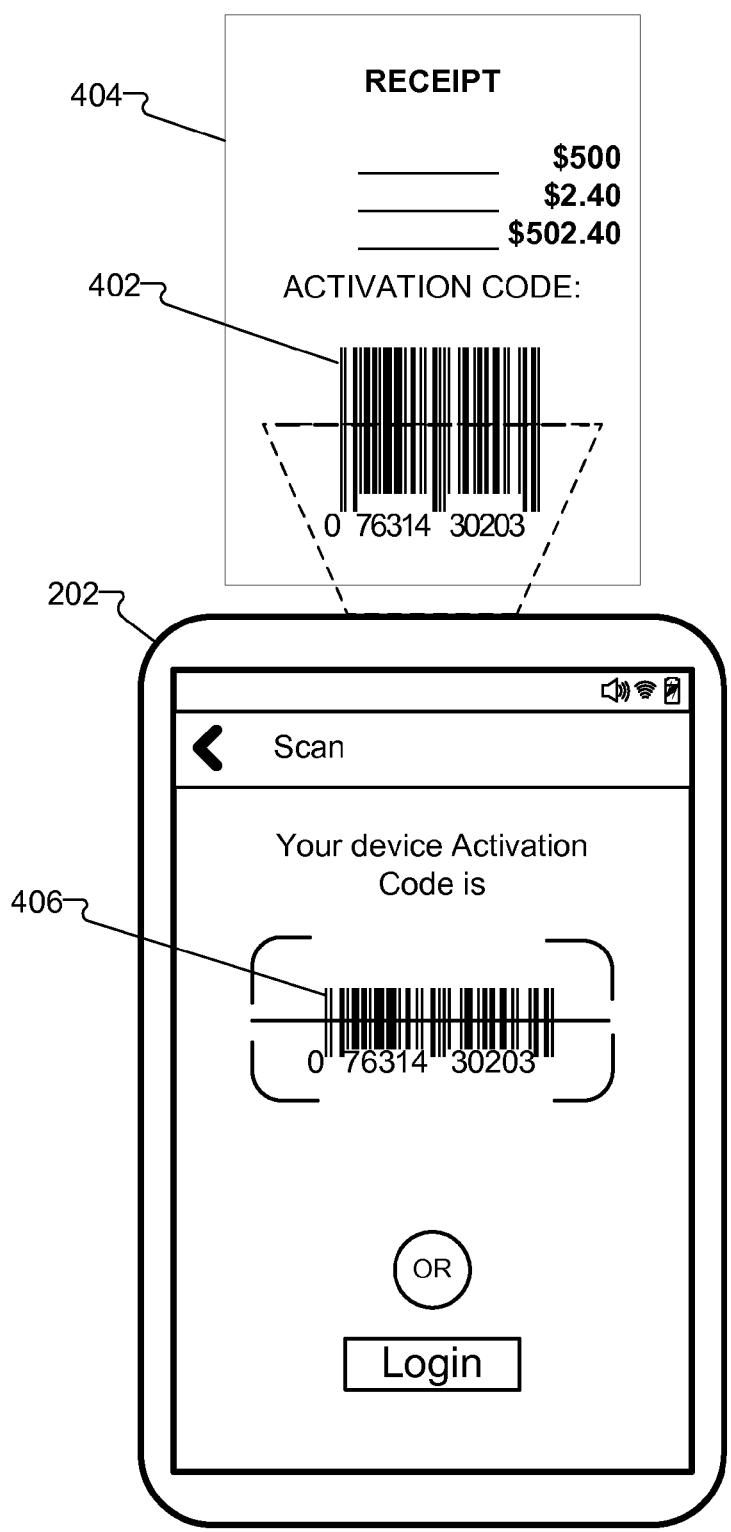
FIG. 4 illustrates an example of a mobile device being used to capture an image of an activation code according to principles described herein.

A user of mobile device 202 may use mobile device 202 to scan an activation code. For example, after or while GUI view 300 is displayed by mobile device 202, the user may use a camera of mobile device 202 to capture an image of an activation code. FIG. 4 illustrates an example of mobile device 202 being used to capture an image of an activation code 402 from a physical purchase receipt 404. In the illustrated example, activation code 402 includes a combination of a bar code and an alphanumeric code, which may individually or in combination represent any of the information described herein, such as a user account identifier for a user account associated with the purchase of mobile device 202. As shown, a visual representation 406 of the activation code 402 may be displayed in a GUI view on the display screen of mobile device 202 when the camera is pointed at the activation code 402 or after an image of the activation code 402 is captured.

In certain examples, client 204 running on mobile device 202 may invoke a native device scanning application program interface ("API"), such as a native barcode scanning API (e.g., an AVFoundation API, a Zebra Crossing API, or a related third-party API). That native scanning API may scan the activation code and provide data representative of the scanned activation code to client 204 or activation server system 206.

In certain examples, in addition to prompting the user of mobile device 202 to provide an activation code, activation management facility 102 may prompt the user to provide a password, such as a password for a user account with the mobile network. This may enhance the security of the activation systems and methods described herein.

Instead of the user providing an activation code as prompted by option 302-1 in FIG. 3, the user may provide user account login information to authenticate mobile device 202 to a user account associated with the mobile network as prompted by option 302-2 in FIG. 3. This may be accomplished in any suitable way. For example, the user may select option 302-2 in GUI view 300. In response, activation management facility 102 may provide one or more tools in a GUI view for use by the user to enter and submit login information.

Authentication by way of user account login information may be particularly useful in a situation in which the user does not have an activation code, such as may be the case when the user purchases mobile device 202 in a manner that does not allow the user to receive an activation code in conjunction with the purchase of mobile device 202. For example, the user may purchase mobile device 202 from an entity other than a provider of the mobile network, such as from a previous owner of mobile device 202 or from a third-party storefront (e.g., a vending machine at an airport).

In certain examples, the user of mobile device 202 may have an existing user account with the network provider. In other examples, the user of mobile device 202 may create a user account with the network provider in conjunction with the purchase or the activation of mobile device 202. For example, if the user does not have a user account with the network provider when GUI view 300 is displayed, the user may select option 302-2 and receive one or more tools (e.g., in another GUI view) that the user may use to create a new user account with the network provider in any suitable way. Once the new user account is created, the user may provide authentication information to be used to authenticate mobile device 202 to the newly-created user account with network provider in any of the ways described herein.

After the user has provided authentication information such as an activation code and/or login information, client 204 may direct mobile device 202 to send the authentication information to activation server system 206 over network 208. Activation server system 206 may receive and process the authentication information to authenticate mobile device 202 to the mobile network. This may include activation server system 206 identifying a user account identifier from the authentication information and accessing a database of user account information to identify a matching user account (e.g., a user account with a matching user account identifier on file). Activation server system 206 may also verify that a password included in the authentication information matches a password on file for the user account. If matches are found, activation server system 206 may authenticate mobile device 202 to the user account.

In certain examples, activation management facility 102 may access and provide certain information about mobile device 202 as part of authenticating mobile device 202. For example, client 204 may direct mobile device 202 to provide one or more identifiers, such as one or more device and/or SIM card identifiers, to activation server system 206. Activation server system 206 may receive such information (e.g., at least one of a mobile device identifier and a SIM card identifier) and associate the information with the user account when mobile device 202 is authenticated to the user account. After the information is associated with the user account, activation management facility 102 may use the information in one or more activation operations, such as in one or more operations performed to provide an interactive activation flow. Because mobile device 202 has access to such information about mobile device 202 and is used in the activation process as described herein, activation management facility 102 may access and associate the information with the user account in a convenient and/or reliable manner such that the information may be used in one or more activation operations, which may help provide an efficient and/or accurate activation process.

In response to authentication of mobile device 202 to a user account associated with the mobile network, activation management facility 102 of system 100 may establish an activation session between the authenticated mobile device 202 and the user account. This may be performed in any suitable way. For example, activation server system 206 and client 204 of the authenticated mobile device 202 may exchange one or more communications to establish the activation session. The establishment of the activation session may include client 204 and/or activation server system 206 providing the authenticated mobile device 202 with access to one or more activation resources, such as with access to the user account and/or resources that are part of an activation flow. The activation session may remain active until a completion or a failure of an activation of the authenticated mobile device 202.

During the activation session, activation management facility 102 may provide an interactive activation flow by way of the authenticated mobile device 202. Activation management facility 102 may provide the interactive activation flow by providing, by way of mobile device 202, one or more activation user interfaces for presentation to a user of mobile device 202. Activation management facility 102 may provide a set of activation user interfaces in a particular flow, which may be defined in advance and/or may be dynamically selected based on user interaction with the user interfaces. Accordingly, an interactive activation flow may include any set of activation user interfaces provided, in any suitable order and/or configuration, for presentation to the user of mobile device 202 by way of mobile device 202.

As activation management facility 102 provides activation user interfaces of an interactive activation flow, activation management facility 102 may receive user input representative of user interaction with the activation user interfaces of the interactive activation flow. The user input may represent one or more activation parameters selected by the user and that may be used by activation management facility 102 to activate mobile device 202 on the mobile network. For example, user input may represent a selection of a type of activation for mobile device 202, a selection of an already-active mobile device to be upgraded with mobile device 202, a selection of a mobile wireless communication service plan for mobile device 202, a selection of a mobile telephone number for mobile device 202, a selection of service features for mobile device 202, and/or any other activation parameter.

Examples of interactive activation flows that may be provided by activation management facility 102, as well as examples of user interaction with the interactive activation flows will now be described.

Figure 5A:
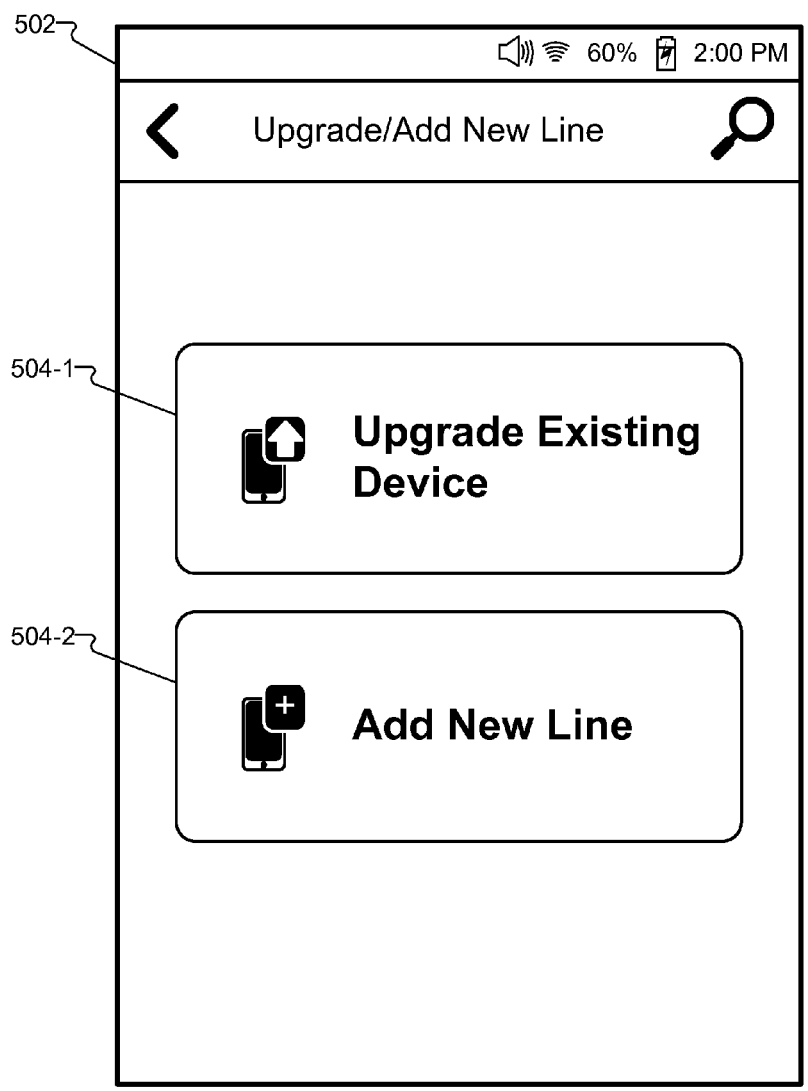
FIGS. 5A-9 illustrate exemplary graphical user interface views according to principles described herein.
Figure 5B:
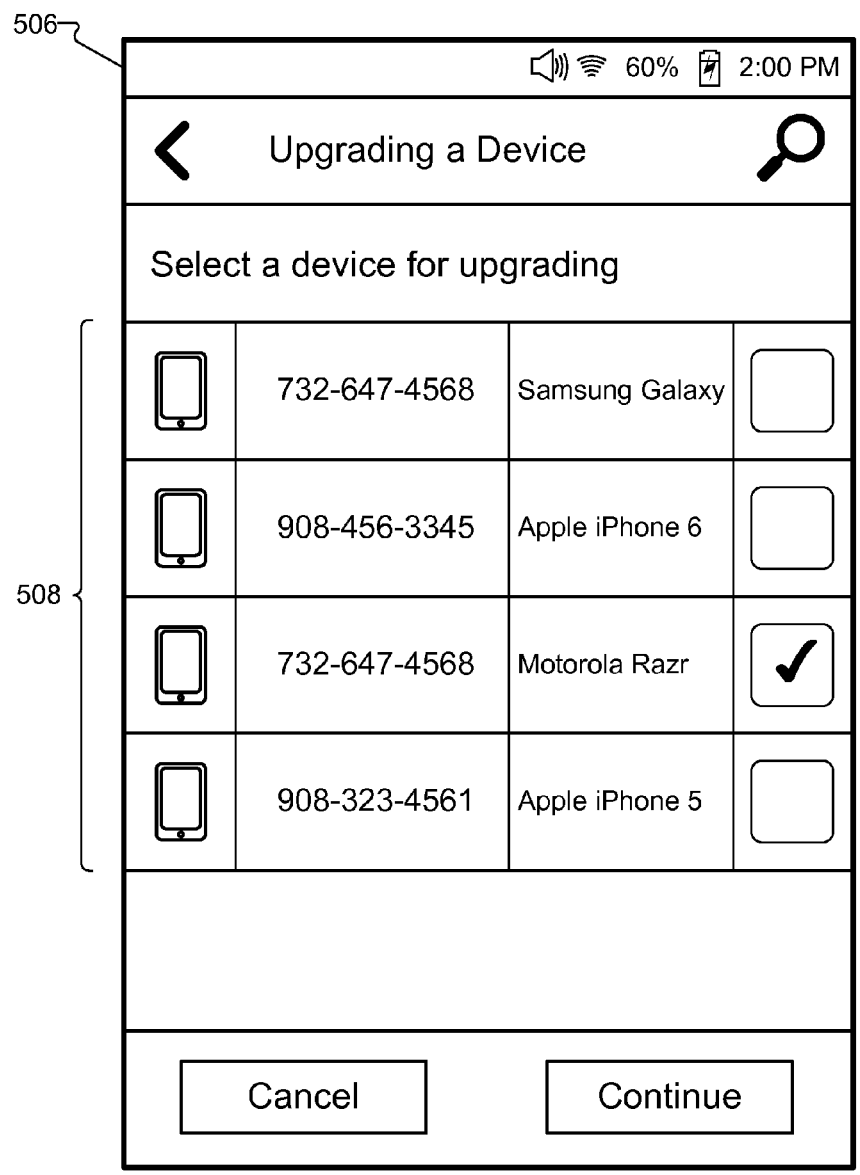
Figure 5C:
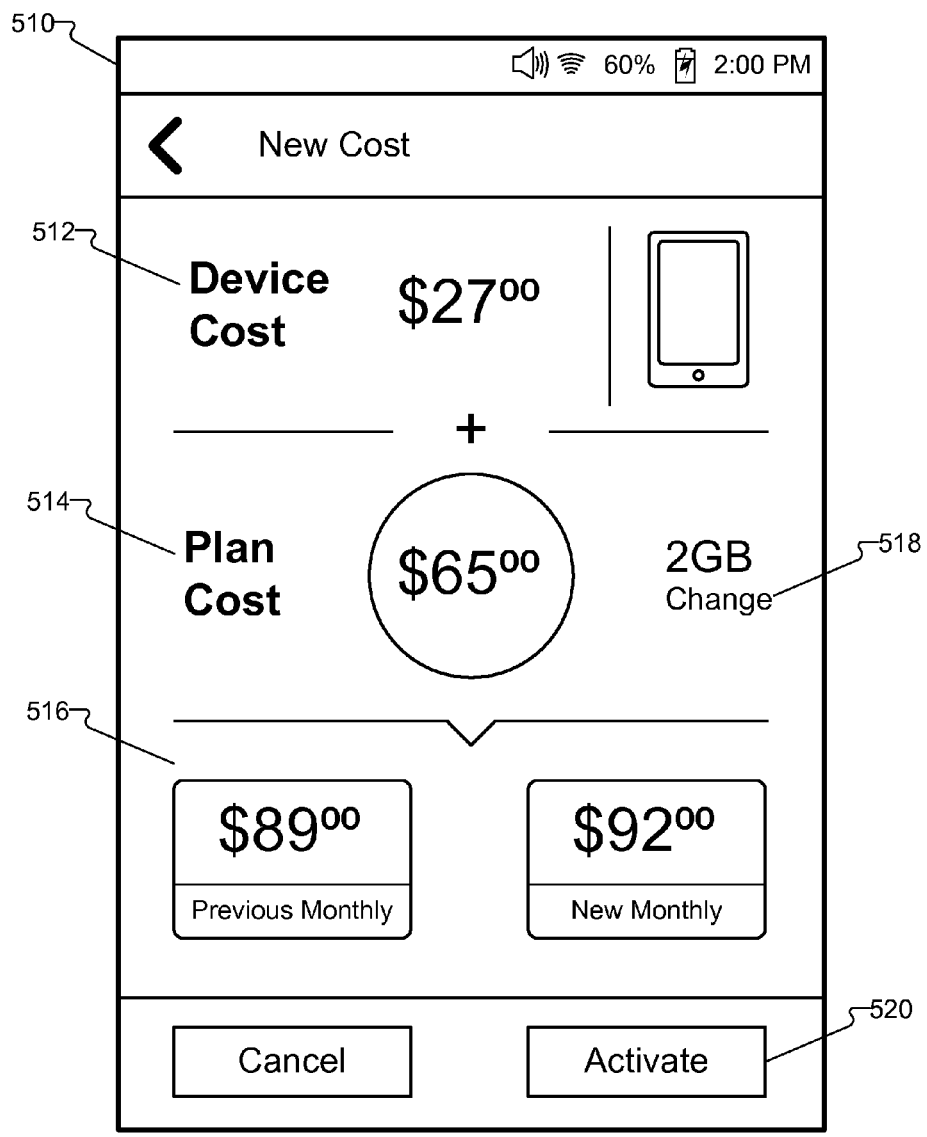

FIGS. 5A-5C illustrate exemplary GUI views that may be displayed by mobile device 202 as part of an interactive activation flow provided by activation management facility 102. In certain examples, activation management facility 102 may provide the GUI views when the user of mobile device 202 is an existing customer of the mobile network provider (e.g., the user has an existing user account associated with the mobile network and/or already has another mobile device activated on the mobile network and associated with the user account).

After activation management facility 102 authenticates mobile device 202 to a user account associated with the mobile network and establishes an activation session with mobile device 202, activation management facility 102 may provide a GUI view 502 shown in FIG. 5A for display by mobile device 202. As shown, GUI view 502 may include options 504 (e.g., options 504-1 and 504-2) that indicate different types of activation that may be selected by a user of mobile device 202. Option 504-1 may be selected by the user to indicate that the user wants to upgrade another mobile device associated with the user account with the mobile network provider, and option 504-2 may be selected by the user to indicate that the user wants to add mobile device 202 as an additional activated device on the user account (e.g., by adding a new telephone line or number for mobile phone 202 to the user account).

In response to a user selection of option 504-1 in GUI view 502, activation management facility 102 may provide a GUI view 506 shown in FIG. 5B for display by mobile device 202. As shown, GUI view 506 may include a list 508 of mobile devices already associated with the user account. In the illustrated example, each of the mobile devices on the user account is assigned a mobile telephone number. Each of the mobile devices indicated in GUI view 506 may be selectable by the user to choose which of the mobile devices is to be upgraded.

In response to a user selection of one of the mobile devices in list 508 in GUI view 502, activation management facility 102 may provide a GUI view 510 shown in FIG. 5C for display by mobile device 202. As shown, GUI view 510 may include a summary of costs associated with upgrading the selected mobile device to mobile device 202. The summary of costs may indicate a device cost 512 (e.g., a monthly cost for mobile device 202 such as may be charged if mobile device 202 is purchased through an installment payment plan), a plan cost 514 (e.g., a monthly cost for the existing plan), and a comparison cost 516 (e.g., a comparison of a pre-upgrade monthly cost and a post-upgrade monthly cost).

GUI view 510 may also include a plan change option 518 selectable by the user to launch another GUI view that includes one or more tools for use by the user to change the existing plan to another plan (e.g., such as to a plan with a higher data maximum). GUI view 510 may also include an option 520 selectable by the user to conclude the interactive activation flow.

FIGS. 6A-6E illustrate exemplary GUI views that may be displayed by mobile device 202 as part of an interactive activation flow provided by activation management facility 102. In certain examples, activation management facility 102 may provide the GUI views shown in FIGS. 6A-6E when the user of mobile device 202 is an existing customer of the mobile network provider (e.g., the user has an existing user account associated with the mobile network and/or already has another mobile device activated on the mobile network).

Figure 6A:
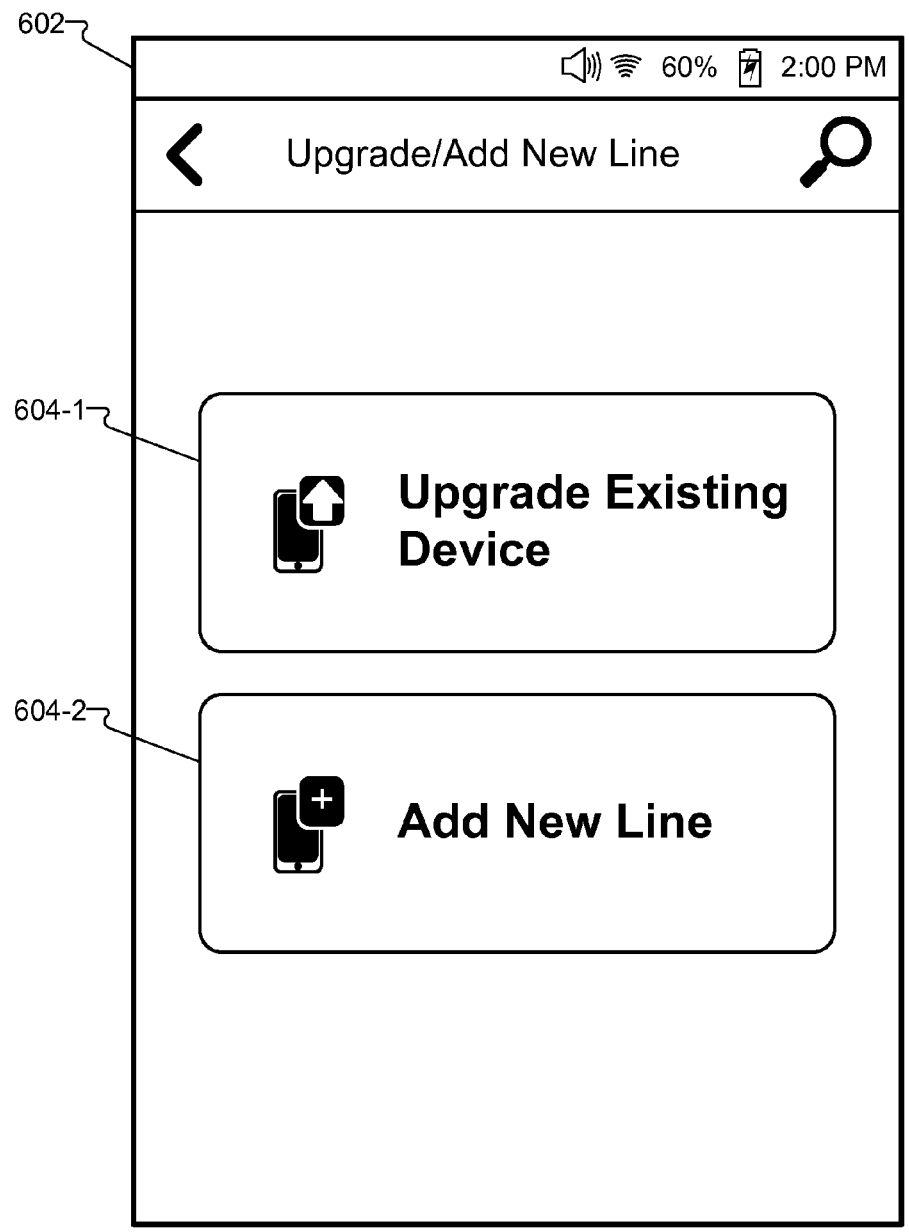

After activation management facility 102 authenticates mobile device 202 to a user account associated with the mobile network and establishes an activation session with mobile device 202 as described above, activation management facility 102 may provide a GUI view 602 shown in FIG. 6A for display by mobile device 202. As shown, GUI view 602 may indicate options 604 (e.g., options 604-1 and 604-2) that indicate different types of activation that may be selected by a user of mobile device 202. Option 604-1 may be selected by the user to indicate that the user wants to upgrade an already-active mobile device associated with the user account, and option 604-2 may be selected by the user to indicate that the user wants to add mobile device 202 as an additional activated device on the user account (e.g., by adding a new telephone line or number for mobile phone 202 to the user account).

Figure 6B:
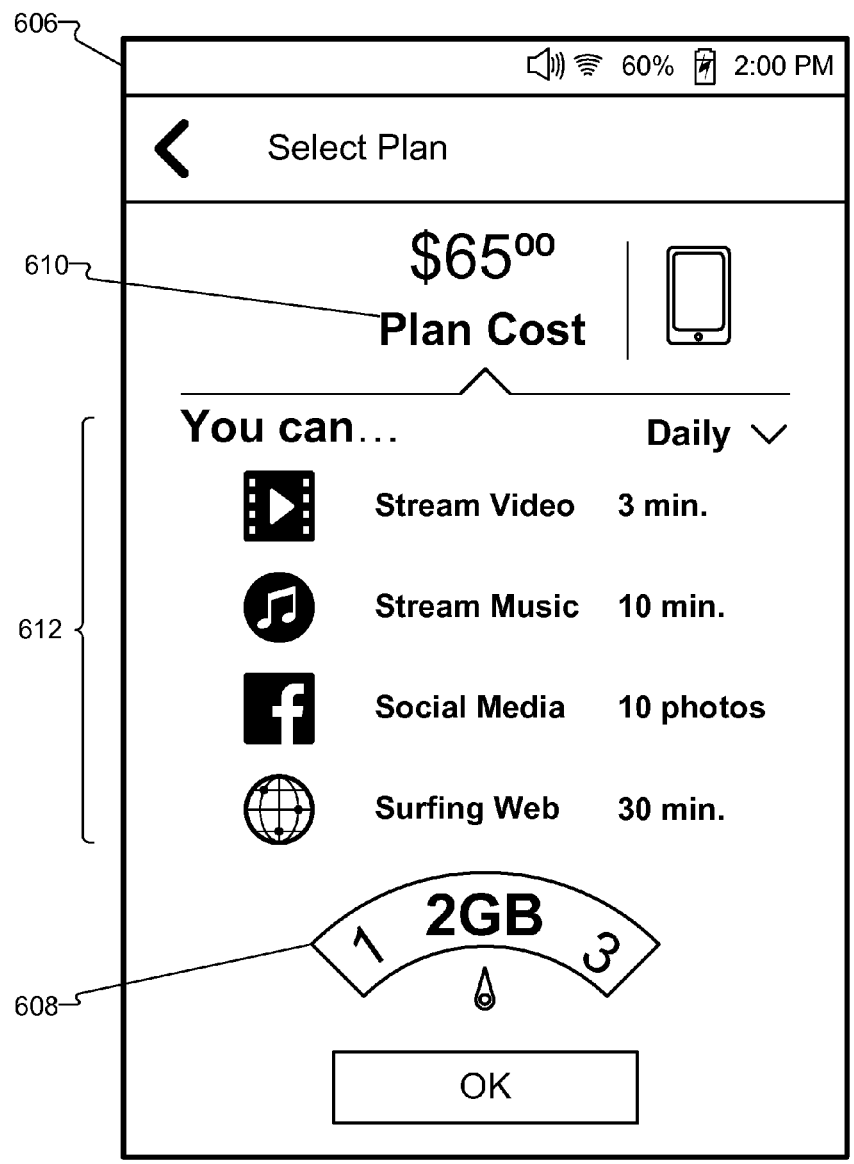

In response to a user selection of option 604-2 in GUI view 602, activation management facility 102 may provide a GUI view 606 shown in FIG. 6B for display by mobile device 202. As shown, GUI view 606 may include a data plan selection option 608 with which the user may interact to select a particular data plan to be associated with mobile device 202. In the illustrated example, data plan selection option 608 allows the user to select a data plan by selecting a maximum monthly data usage limit (e.g., 1 GB, 2 GB, 3 GB, etc. per month). GUI view 606 may indicate information about a selected data plan, such as a monthly plan cost 610 and a list 612 of daily usage limits based on the selected monthly data usage limit. The daily usage limits may be broken down by type of activities. For example, the daily usage limits may indicate a daily usage limit for streaming video, a daily usage limit for streaming music, a daily usage limit for uploading or downloading photos for social media, and a daily limit for surfing the World Wide Web, as shown in FIG. 6B. Accordingly, list 612 may help the user to understand how a monthly usage limit translates into daily usage limits for specific activities, which may help the user determine an appropriate data plan.

Figure 6C:
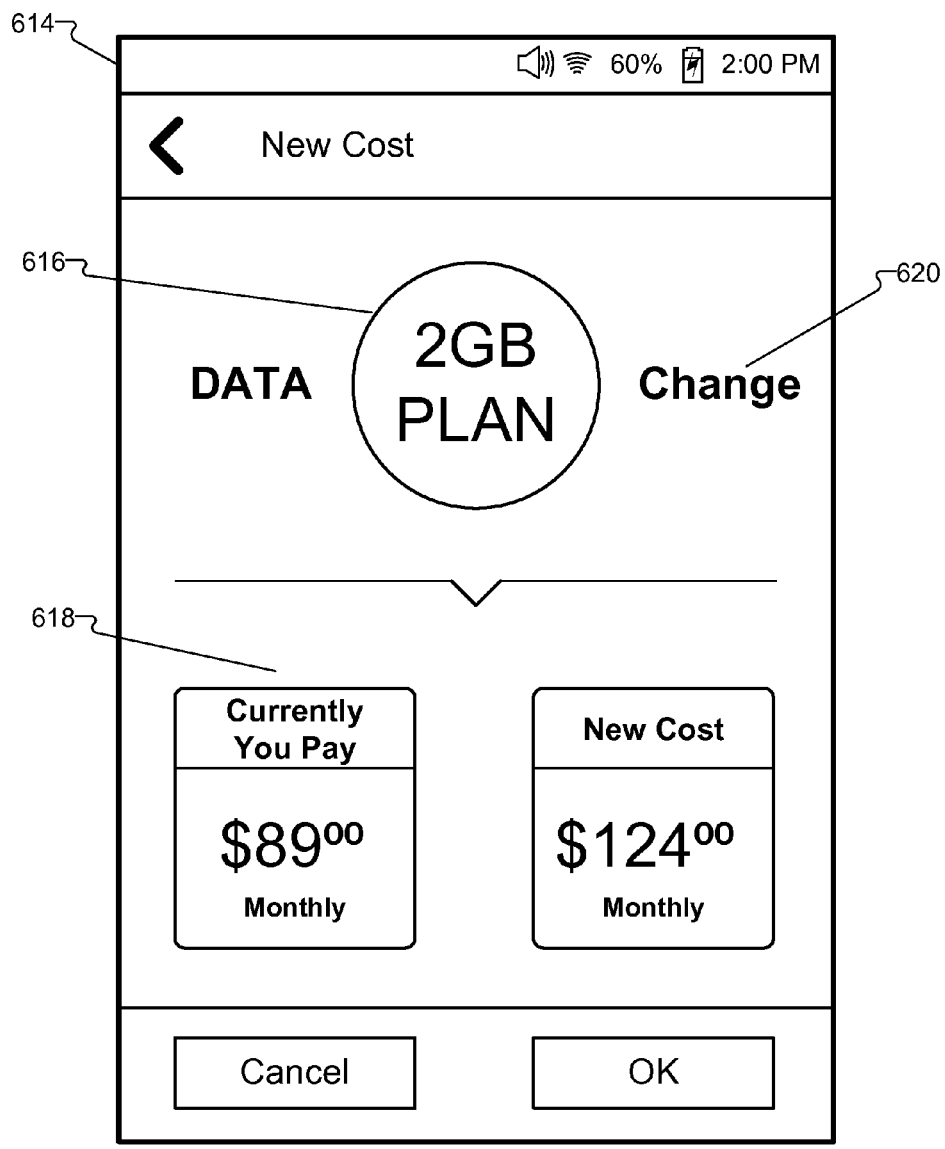

In response to a user selection of a data plan in GUI view 606, activation management facility 102 may provide a GUI view 614 shown in FIG. 6C for display by mobile device 202. As shown, GUI view 614 may include summary of costs associated with adding a new line to the user account with the selected data plan. For example, GUI view 614 may indicate the selected data plan 616 and a comparison cost 618 (e.g., a comparison of a previous monthly cost without the added line and a new monthly cost with the added line at the selected data plan). GUI view 614 may also include a plan change option 620 selectable by the user to launch another GUI view (e.g., GUI view 606) that includes one or more tools for use by the user to change the selected plan to another plan.

Figure 6D:
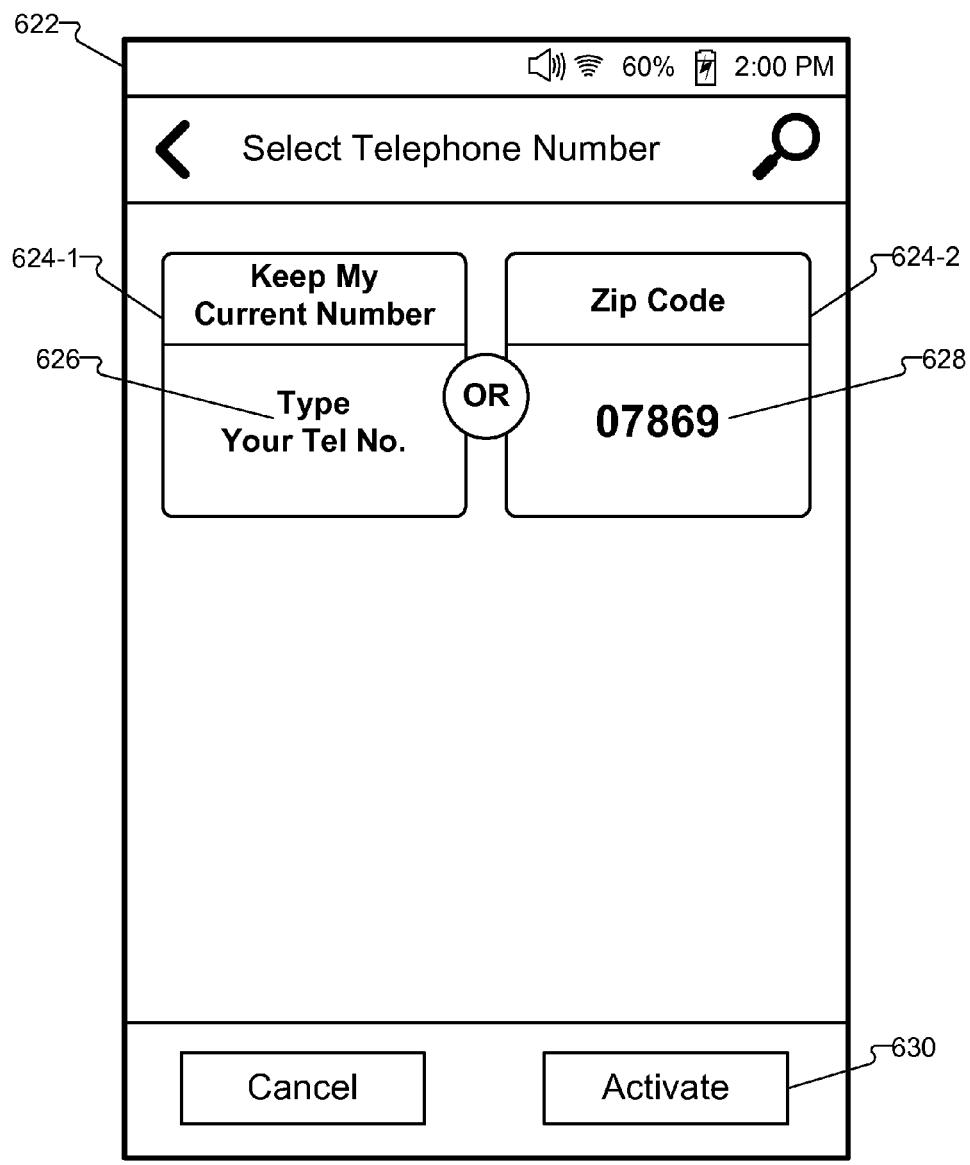

In response to a user providing, in GUI view 614, input indicating acceptance of the selected data plan, activation management facility 102 may provide a GUI view 622 shown in FIG. 6D for display by mobile device 202. As shown, GUI view 622 may include options 624 (e.g., options 624-1 and 624-2) for use by the user to select a telephone number to be assigned to mobile device 202. Option 624-1 may be selected by the user to indicate that the user wants to transfer a telephone number currently used by the user for another telephony device to mobile device 202. Option 624-1 may include a data entry field 626 into which the user may input the telephone number that the user wants to keep by having the telephone number assigned to mobile device 202 (e.g., by porting the telephone number from another service provider). GUI view 622 may also include an option 630 selectable by the user to conclude the interactive activation flow after the user has selected a telephone number to be assigned to mobile device 202.

Alternative to option 624-1, option 624-2 may be selected by the user to indicate that the user wants to assign a new telephone number associated with a particular zip code to mobile device 202. Option 624-2 may include a data entry field 628 into which the user may input a zip code.

Figure 6E:
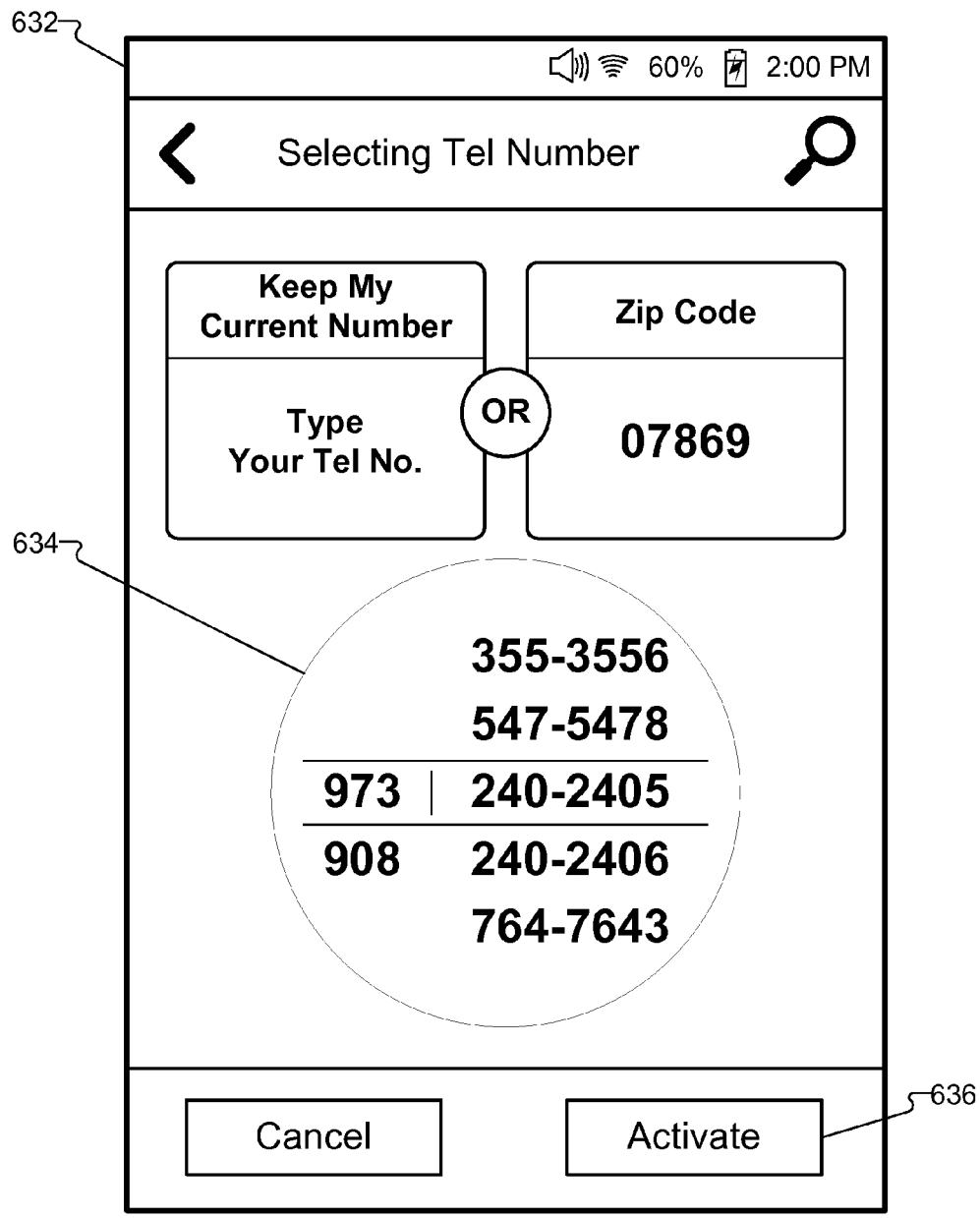

In response to the user indicating, in GUI view 622, a zip code to be used for selection of a telephone number for mobile device 202, activation management facility 102 may provide a GUI view 632 shown in FIG. 6E for display by mobile device 202. As shown, GUI view 632 may include a list 634 of available telephone numbers associated with the zip code and from which the user may select a new telephone number to be assigned to mobile device 202. GUI view 632 may also include an option 636 selectable by the user to conclude the interactive activation flow after the user has selected a telephone number to be assigned to mobile device 202.

FIGS. 7A-7E illustrate exemplary GUI views that may be displayed by mobile device 202 as part of an interactive activation flow provided by activation management facility 102. In certain examples, activation management facility 102 may provide the GUI views of FIGS. 7A-7E when the user of mobile device 202 is a new customer of the mobile network provider (e.g., when the user does not have an existing user account associated with the mobile network and/or has created a new user account that does not yet have a mobile device activated on the mobile network). Activation management facility 102 may detect that mobile device 202 is authenticated to a newly-created user account that does not have a mobile device or telephone number assigned to it, and in response may provide an interactive activation flow such as that represented by FIGS. 7A-7E. As illustrated, the GUI views shown in FIGS. 7A-7E may omit an option to select a type of activation because there is no option to upgrade an existing mobile device when there is no mobile device associated with the user account.

Figure 7A:
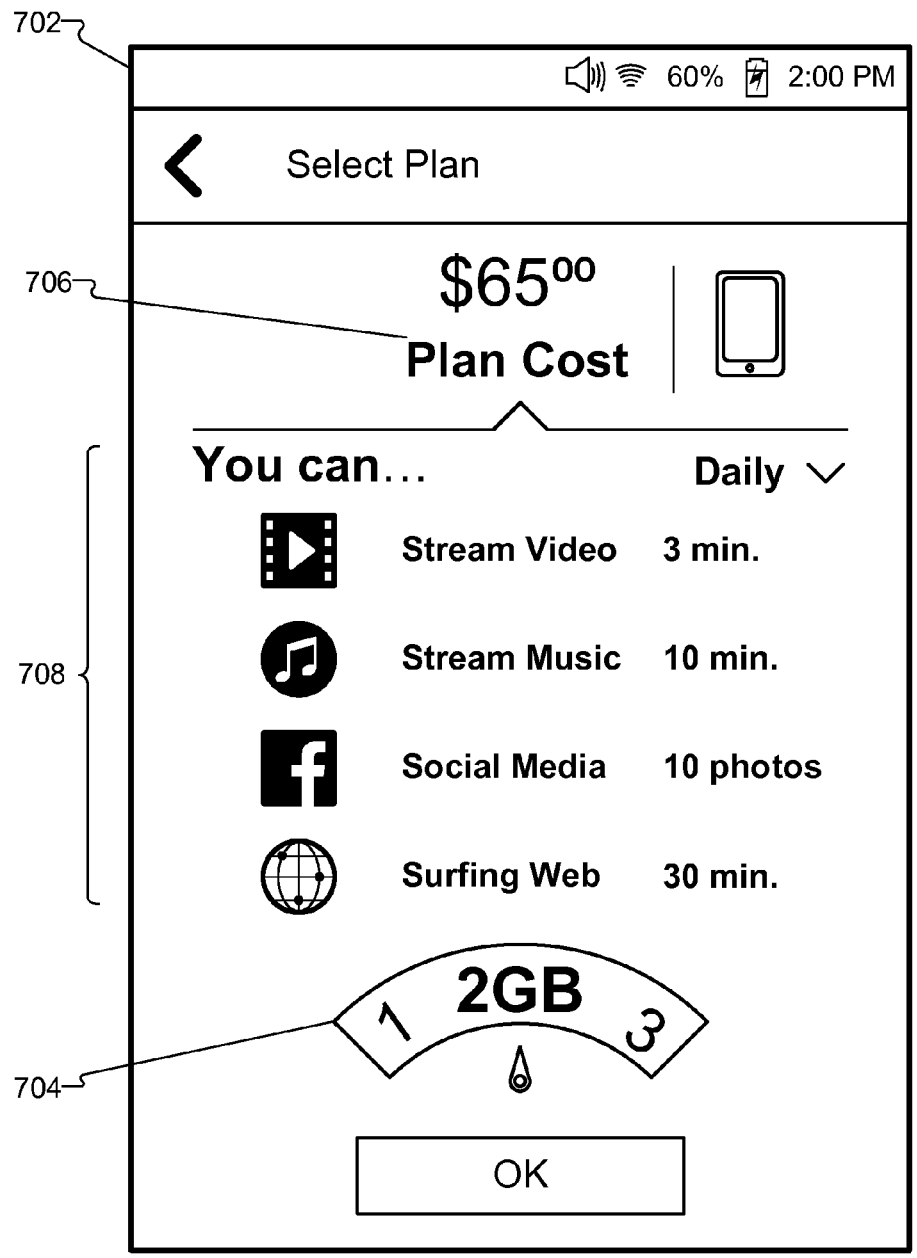

Accordingly, after activation management facility 102 authenticates mobile device 202 to a newly-created user account associated with the mobile network, activation management facility 102 may provide a GUI view 702 shown in FIG. 7A for display by mobile device 202. As shown, GUI view 702 may include a data plan selection option 704 with which the user may interact to select a particular data plan to be associated with mobile device 202. In the illustrated example, data plan selection option 704 allows the user to select a data plan by selecting a maximum monthly data usage limit (e.g., 1 GB, 2 GB, 3 GB, etc. per month). GUI view 702 may indicate information about a selected data plan, such as a monthly plan cost 706 and a list 708 of daily usage limits based on the selected monthly data usage limit. The daily usage limits may be broken down by type of activities. For example, the daily usage limits may indicate a daily usage limit for streaming video, a daily usage limit for streaming music, a daily usage limit for uploading or downloading photos for social media, and a daily limit for surfing the World Wide Web, as shown in FIG. 7A. Accordingly, list 708 may help the user to understand how a monthly usage limit translates into daily usage limits for specific activities, which may help the user determine an appropriate data plan.

Figure 7B:
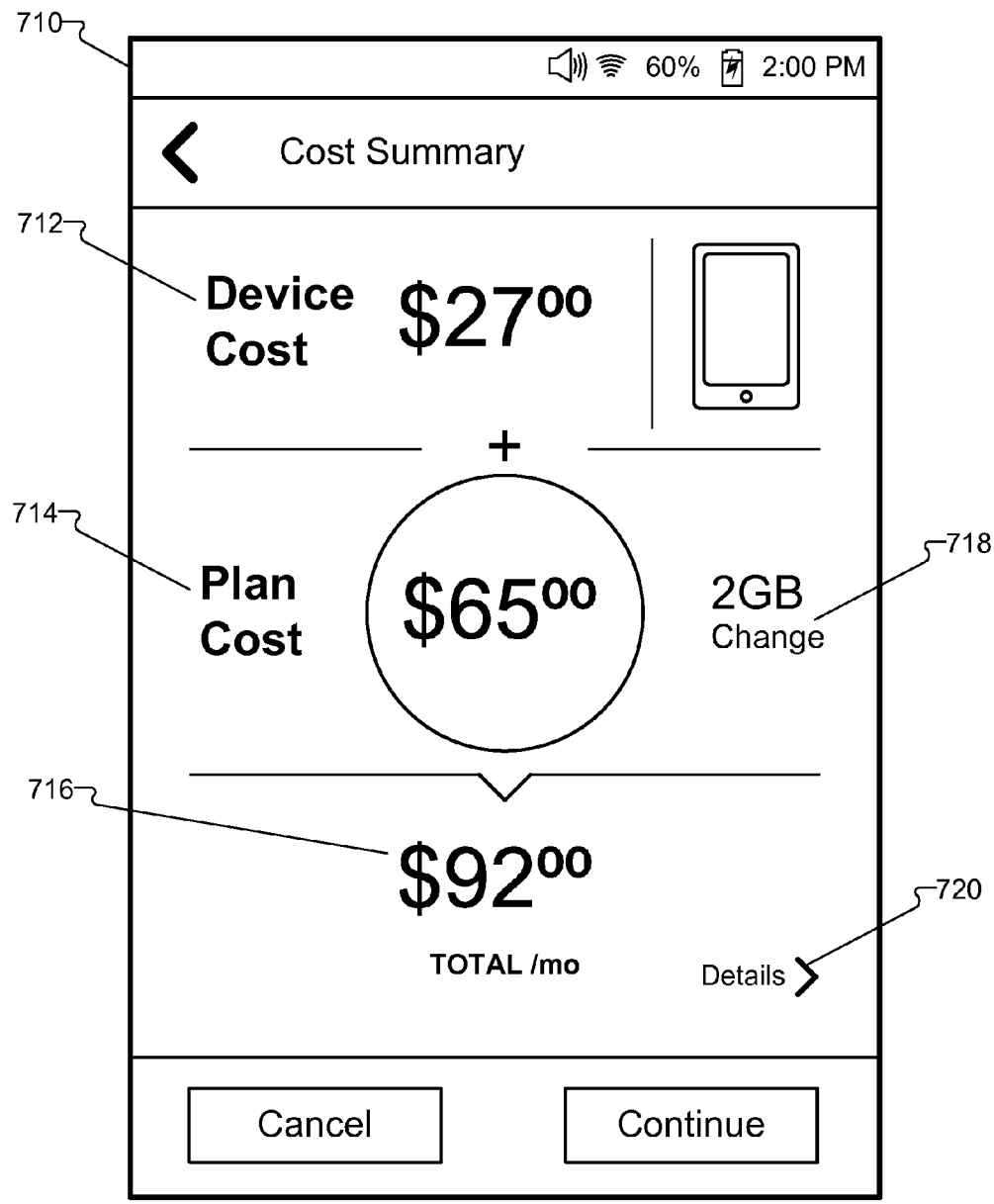

In response to a user selection of a data plan in GUI view 702, activation management facility 102 may provide a GUI view 710 shown in FIG. 7B for display by mobile device 202. As shown, GUI view 710 may include a summary of costs associated with mobile device 202 and a selected data plan. The summary of costs may indicate a device cost 712 (e.g., a monthly cost for mobile device 202 such as may be charged if mobile device 202 is purchased through an installment payment plan), a plan cost 714 (e.g., a monthly cost for the existing plan), and a total cost 716 for the device and the data plan.

GUI view 710 may also include a plan change option 718 selectable by the user to launch another GUI view that includes one or more tools for use by the user to change the existing plan to another plan (e.g., such as to a plan with a higher data maximum). GUI view 710 may also include an option 720 selectable by the user to launch another GUI view that presents a more detailed breakdown of the costs of mobile device 202 and the selected data plan.

Figure 7C:
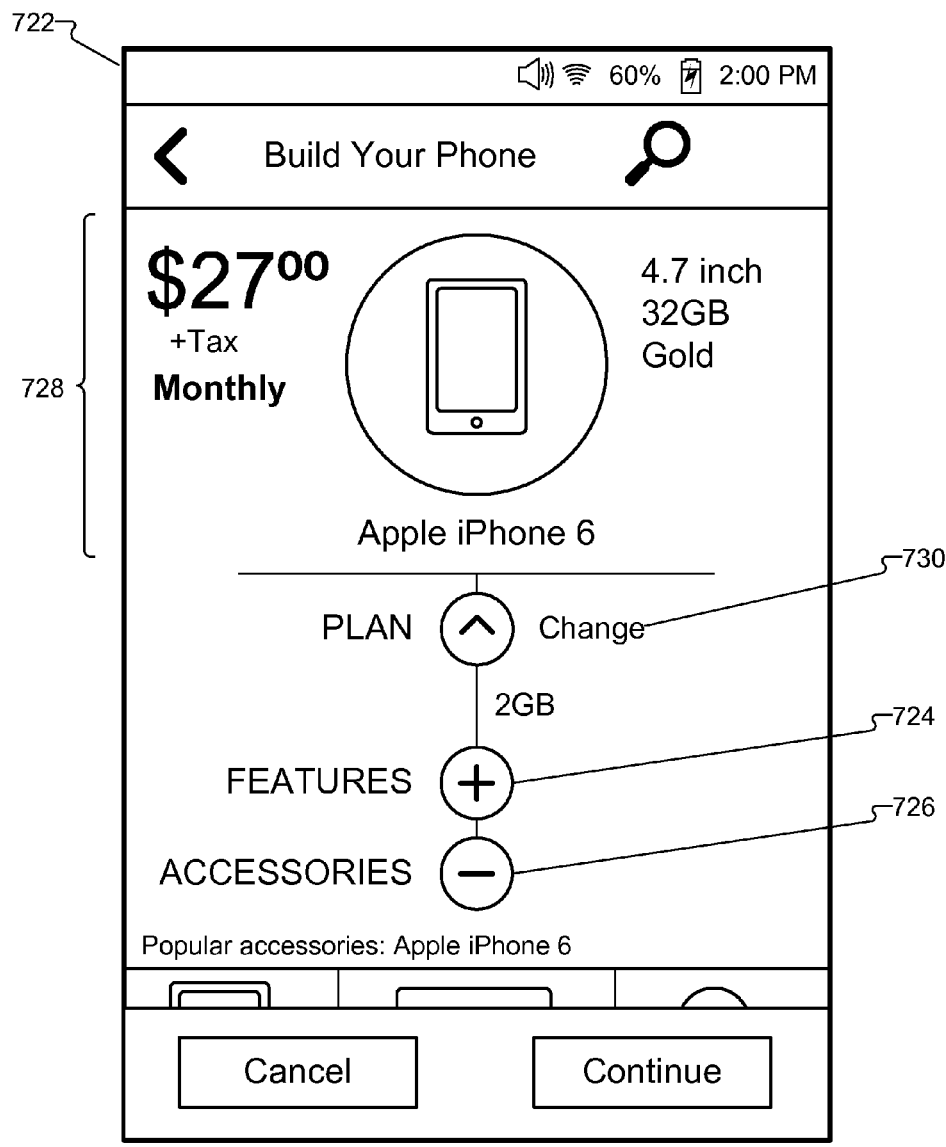

In response to a user providing, in GUI view 710, input indicating acceptance of the costs of mobile device 202 and the selected data plan, activation management facility 102 may provide a GUI view 722 shown in FIG. 7C for display by mobile device 202. As shown, GUI view 722 may include tools for use by the user to customize mobile device 202 and/or plan features. For example, GUI view 722 may include an option 724 for use by the user to select options to add to mobile device 202 and/or the data plan and option 726 for use by the user to select accessories to purchase for mobile device 202.

GUI view 722 may also include a summary 728 of information about mobile device 202. As shown, the summary 728 may indicate a cost of mobile device 202, a make and model of mobile device 202, and features of mobile device 202. GUI view 722 may also include a plan change option 730 selectable by the user to launch another GUI view that includes one or more tools for use by the user to change the existing plan to another plan (e.g., such as to a plan with a higher data maximum).

Figure 7D:
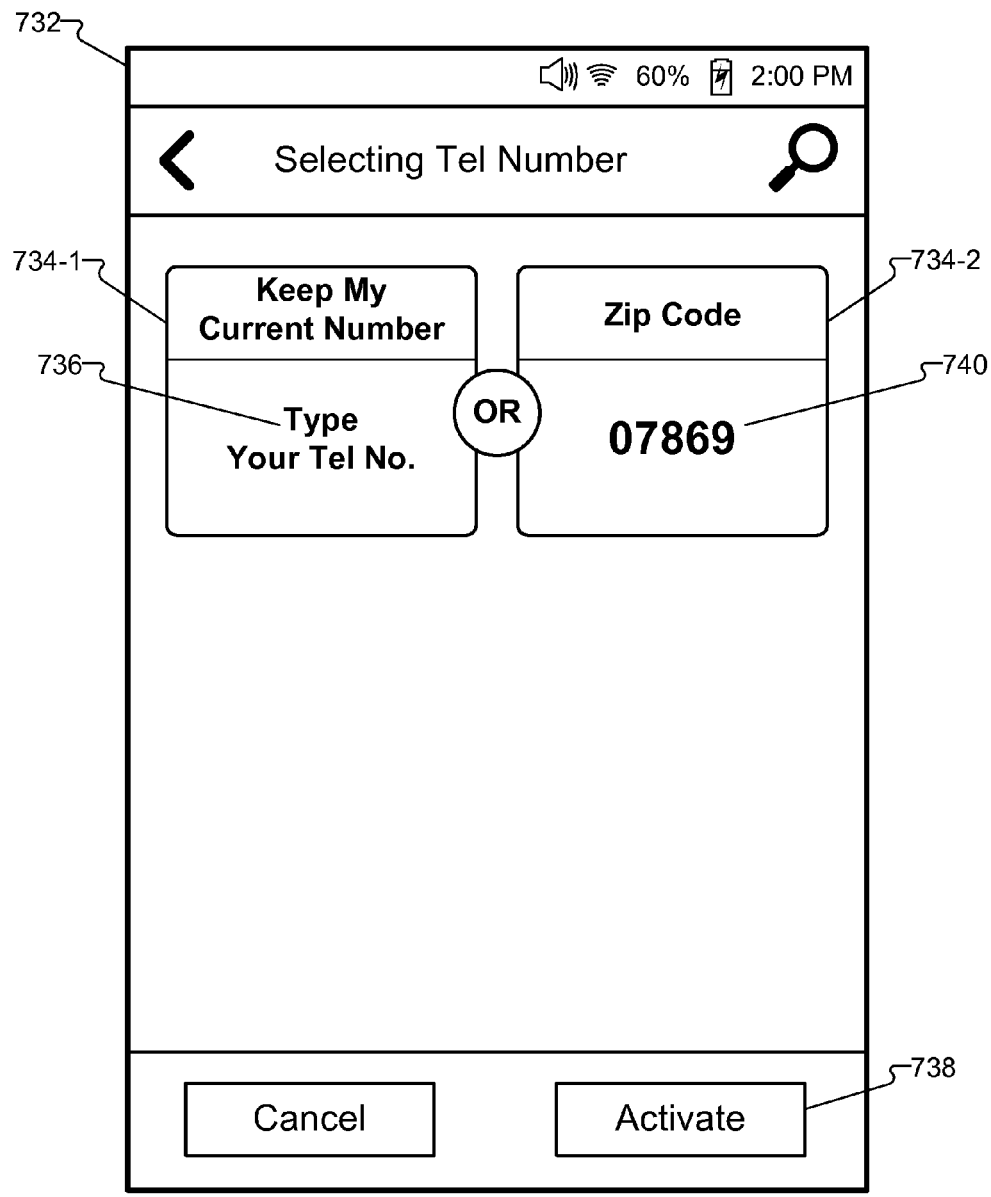

In response to a user providing, in GUI view 722, input indicating acceptance of the selected features of mobile device 202 and the data plan, activation management facility 102 may provide a GUI view 732 shown in FIG. 7D for display by mobile device 202. As shown, GUI view 732 may include options 734 (e.g., options 734-1 and 734-2) for selecting a telephone number to be assigned to mobile device 202. Option 734-1 may be selected by the user to indicate that the user wants to transfer a telephone number currently used by the user on another telephony device to mobile device 202. Option 734-1 may include a data entry field 736 into which the user may input the telephone number that the user wants to keep by having the telephone number assigned to mobile device 202. GUI view 732 may also include an option 738 selectable by the user to conclude the interactive activation flow after the user has selected a telephone number to be assigned to mobile device 202.

Alternative to option 724-1, option 724-2 may be selected by the user to indicate that the user wants to assign a new telephone number associated with a particular zip code to mobile device 202. Option 724-2 may include a data entry field 740 into which the user may input a zip code.

Figure 7E:
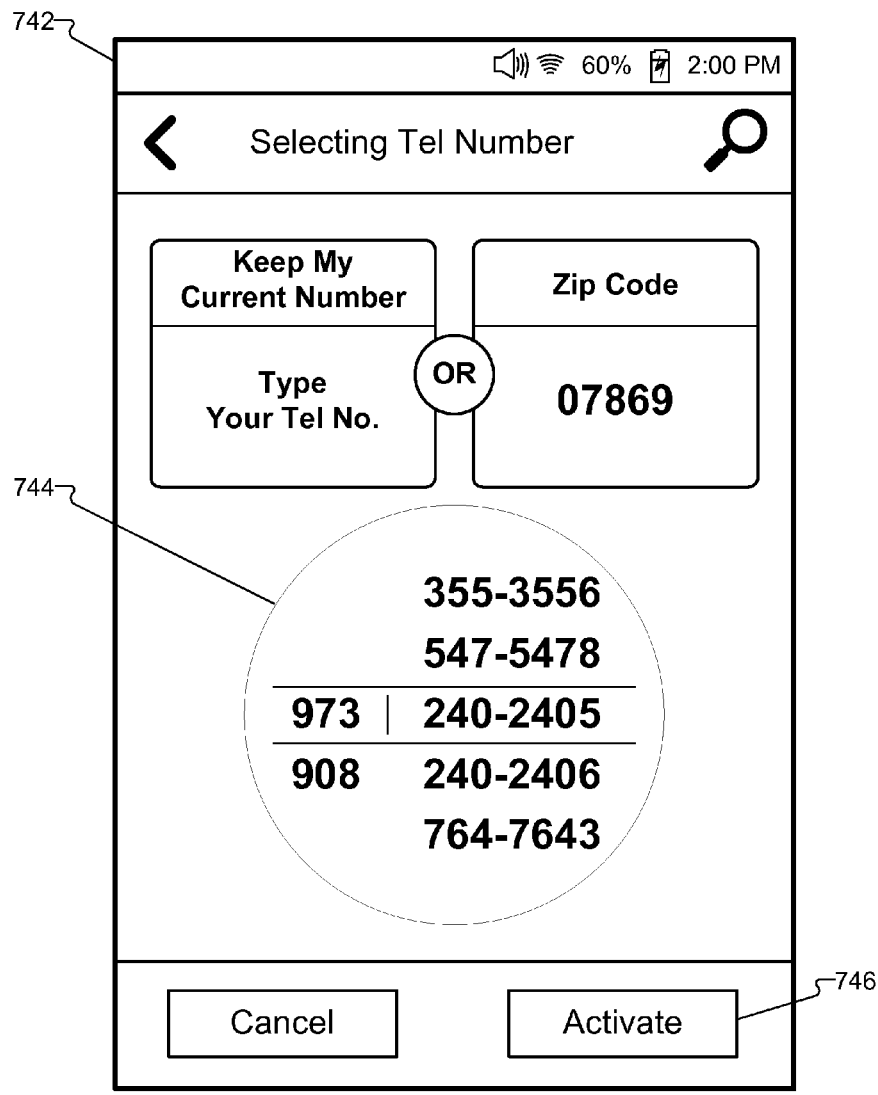

In response to the user indicating, in GUI view 722, a zip code to be used for selection of a telephone number for mobile device 202, activation management facility 102 may provide a GUI view 742 shown in FIG. 7E for display by mobile device 202. As shown, GUI view 742 may include a list 744 of available telephone numbers associated with the zip code and from which the user may select a new telephone number to be assigned to mobile device 202. GUI view 742 may also include an option 746 selectable by the user to conclude the interactive activation flow after the user has selected a telephone number to be assigned to mobile device 202.

In response to the user providing input to conclude an interactive activation flow, activation management facility 102 may activate the mobile wireless communication device on the mobile wireless communication network in association with the user account based on user interaction with the interactive activation flow by way of the mobile wireless communication device. For example, activation management facility 102 may perform one or more activation operations to activate mobile device 202 based on one or more activation parameters selected by the user through user interaction with the interactive activation flow. Such operations may include activation management facility 102 communicating with one or more mobile network provider systems to activate mobile device 202 on the mobile network. To illustrate, client 204 may direct mobile device 202 to transmit an activation request that includes data representing information to be used to activate mobile device 202 (e.g., data representing one or more activation parameters selected by the user through user interaction with the interactive activation flow) to activation server system 206 by way of network 208. Activation server system 206 may receive the activation request and use data included in the activation request to activate mobile device 202 on the mobile network in association with the user account. Activation server system 206 may determine that activation is successful and may send a notification of successful activation to client 204 of mobile device 202.

Figure 8:
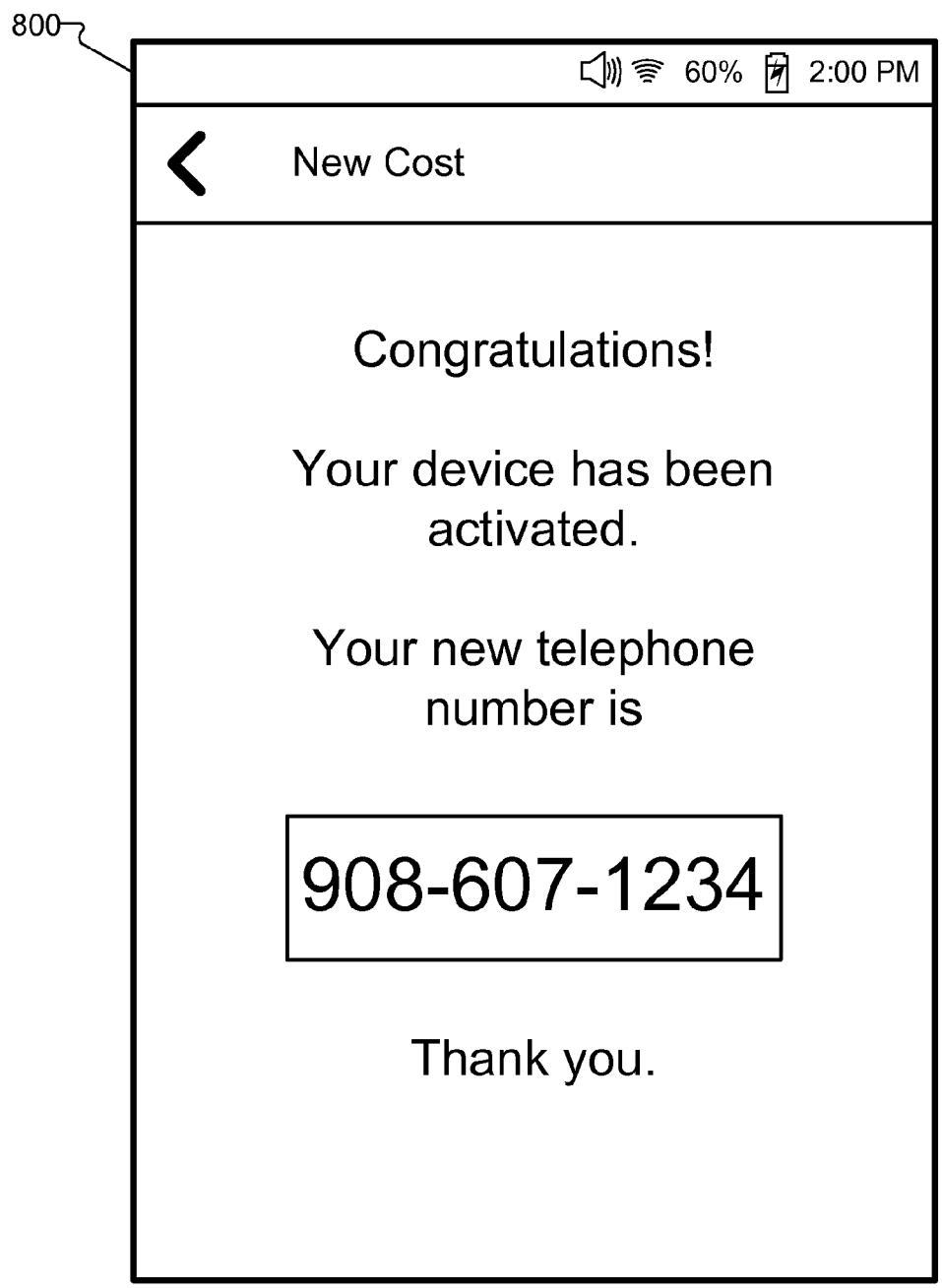

In certain examples, activation management facility 102 may provide a notification of successful activation to the user of mobile device 202. FIG. 8 illustrates an exemplary GUI view 800 that may be provided for display on a display screen of mobile device 202. As shown, GUI view 800 may include a notification that mobile device 202 has been successfully activated.

Once activated, mobile device 202 may be allowed to send and receive communications over the mobile network. The activated mobile device 202 may be associated with the user account, such as with a telephone line or number assigned to the user account.

Figure 9:
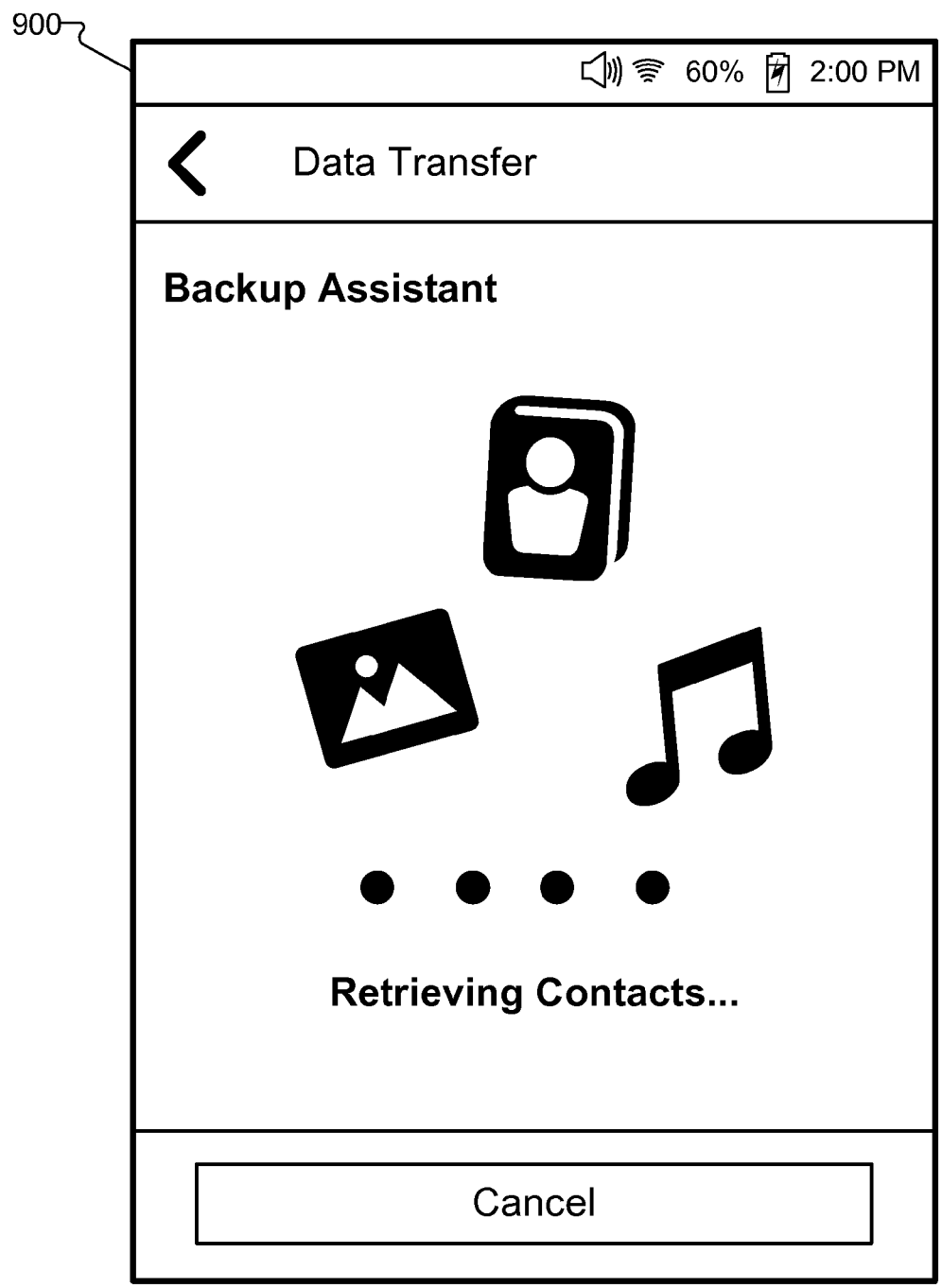

In certain examples, after mobile device 202 has been activated, activation management facility 102 may provide backup assistant tool and/or process to facilitate download of account information from the user account to mobile device 202. FIG. 9 illustrates an exemplary GUI view 900 that may be provided for display on a display screen of mobile device 202. As shown, GUI view 900 may include a backup assistant, which may facilitate download of user account information to mobile device 202. For example, mobile device 202 may download contacts data stored remotely as part of a user account for to mobile device 202 for local storage on mobile device 202. The backup assistant may facilitate download of data from the user account with the mobile network provider and/or from any other suitable user account (e.g., a GOOGLE account, etc.).

Activation server system 206 may be implemented in any suitable way. For example, activation server system 206 may include or be part of any server-side configuration capable of performing the server-side operations of system 100 described herein.

Figure 10:
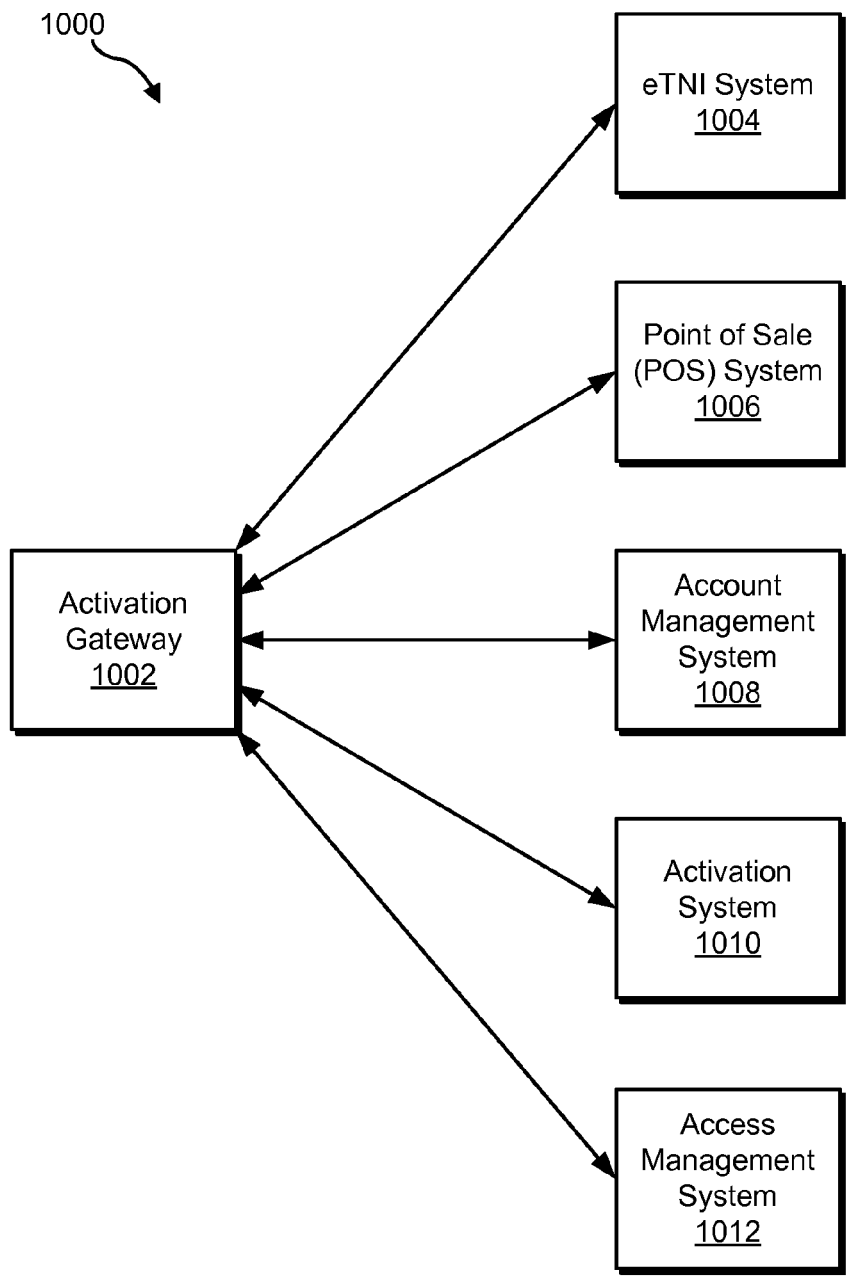
FIG. 10 illustrates an exemplary server-side configuration according to principles described herein.

FIG. 10 illustrates an exemplary server-side configuration 1000 ("configuration 1000"). As shown, configuration 1000 may include an activation gateway 1002 communicatively coupled to an enterprise telephone numbering inventory ("eTNI") system 1004, a point of sale ("POS") system 1006, an account management system 1008, an activation system 1010, and an access management system 1012. Each of systems 1002-1012 may include one or more computing devices (e.g., server devices, databases, etc.) configured to provide one or more functions and/or data that may be used in relation to activating a mobile device on a mobile network.

eTNI system 1004 may manage telephone numbers, such as by maintaining data representative of assignments of telephone numbers to mobile devices and/or user accounts, as well as available telephone numbers that are not assigned to mobile device and/or user accounts. eTNI system 1004 may be used by customer-facing employees of a mobile network provider to obtain telephone number inventory for new activations and/or to effect number changes to support and grow the customer base, for example.

POS system 1006 may provide one or more functions related to sale of products and/or services by a mobile network provider. POS system 1006 may manage data associated with such sales, such as by maintaining data representative of information about such sales. POS system 1006 may provide such functions for any channel through which the mobile network provider sells products or services to customers.

Account management system 1008 may provide one or more functions related to managing customer information. For example, account management system 1008 may maintain data representative of user accounts with a mobile network provider. The data may represent any information related to customers of the mobile network provider, services provided to the customers (e.g., as indicated in customer service profiles), subscription plans of the customers, and/or billing the customers.

Activation system 1010 may provide one or more functions to provision customers and/or mobile devices in various switches, platforms, services, and networks in a mobile network. To this end, activation system 1010 may interface with elements of the mobile network to provision customers and/or mobile devices in the mobile network.

Access management system 1012 may provide one or more functions to control access to other elements of configuration 1012. For example, access management system 1012 may perform one or more authentication operations to authenticate a mobile device to a user account maintained by account management system 1008, such as by verifying account login information received from the mobile device.

Systems 1004-1012 may each be accessible to one another and/or to activation gateway 1002 through any suitable technologies, such as by way of one or more suitable APIs. Accordingly, activation gateway 1002 may communicate with systems 1004-1012 to invoke functions of systems 1004-1012 and/or to obtain data from systems 1004-1012.

As an example, activation gateway 1002 may obtain telephone number information from eTNI system 1004, such as a list of telephone numbers that are available for a particular zip code. Additionally or alternatively, activation gateway 1002 may communicate with eTNI system 1004 to invoke one or more telephone number porting and/or assignment operations, such as assigning a telephone number to a user account and/or a mobile device.

As another example, activation gateway 1002 may obtain sales information from POS system 1006, such as information about a purchase of a mobile device. In certain examples, activation gateway 1002 may obtain data representative of an activation code from POS system 1006 or may send data representative of an activation code received from a mobile device for verification by POS system 1006.

As another example, activation gateway 1002 may obtain account information from account management system 1008, such as information about a particular user account associated with a particular user account indicated by an activation code and/or account login information. In certain examples, activation gateway 1002 may obtain account information from account management system 1008 only after authentication of a mobile device to the user account. Additionally or alternatively, activation gateway 1002 may communicate with account management system 1008 to invoke one or more functions to update account information to reflect the performance of one or more activation operations to activate a mobile device to a user account, such as by updating a user account to indicate an assignment of an activated mobile device to the user account and information about the activated mobile device (e.g., selected plan and/or telephone number information).

As another example, activation gateway 1002 may communicate with account management system 1008 to invoke one or more functions to activate a mobile device on a mobile network. This may include sending activation parameter information obtained form an interactive activation flow to activation system 1010 for use in activating the mobile device on the mobile network.

As another example, activation gateway 1002 may communicate with access management system 1012 to invoke one or more functions to authenticate a mobile device to a user account. This may include sending data representative of an authentication request, an activation code, and/or login information to access management system 1012. Access management system 1012 may notify activation gateway 1002 as to whether the mobile device has been authenticated to a user account.

One or more elements of configuration 1000 may include or be implemented as middleware, which may include one or more layers, such as one or more service layers and/or APIs. For example, activation gateway 1002 may include or be implemented as middleware (e.g., as a middleware server) having one or more service layers and/or APIs for use to facilitate communications between a mobile device and one or more of systems 1004-1012.

To illustrate one example, activation gateway 1002 may include a POS middleware service layer, and a mobile device may send a request to the POS middleware service layer using any suitable communication (e.g., an HTTP POST command using iOS's NSURLConnection API). The POS middleware service layer may interact with one or more of systems 1004-1012 to fulfill the request and respond to the mobile device. For example, the POS middleware service layer may invoke an API to make a call to any of the systems 1004-1012 (e.g., an activation API to make a call to activation system 1010).

To illustrate another example, activation gateway 1002 may include an application-specific middleware service layer, and a mobile device may send a request to the application-specific middleware service layer using any suitable communication (e.g., an HTTP POST command using iOS's NSURLConnection API). The application-specific middleware service layer may interact with one or more of systems 1004-1012 to fulfill the request and respond to the mobile device. For example, the application-specific middleware service layer may invoke an API to make a call to access management system 1012 (e.g., an application-specific API to make a call to activation system 1010 to verify login information for an application).

The exemplary configuration 1000 shown in FIG. 10 is illustrative only. Other suitable server-side configurations may be used in other implementations.

Figure 11:
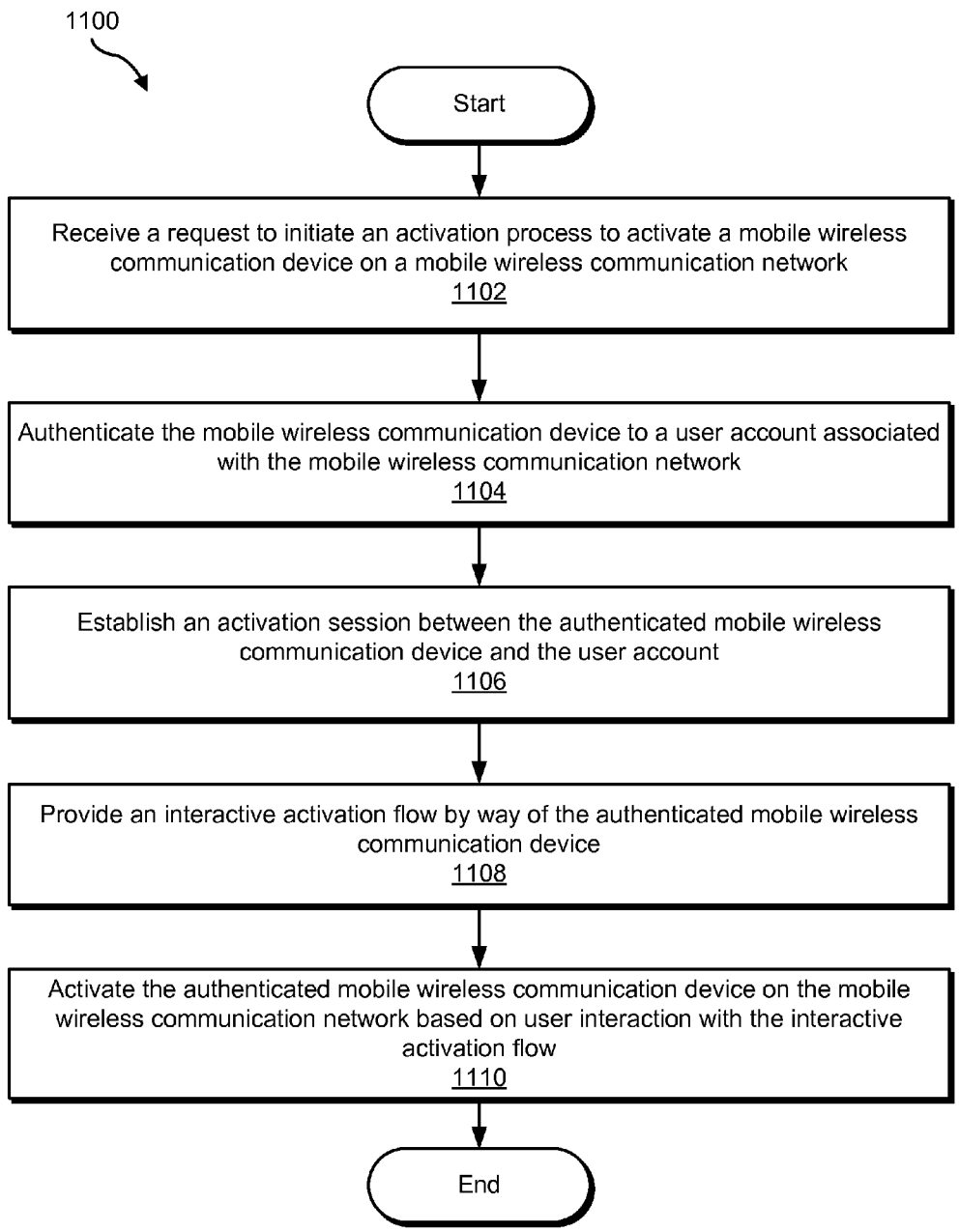
FIG. 11 illustrates an exemplary mobile wireless communication device activation method according to principles described herein.

FIG. 11 illustrates an exemplary mobile wireless communication device activation method 1100. While FIG. 11 illustrates exemplary operations according to certain embodiments, other embodiments may omit, add to, reorder, combine, and/or modify any of the operations shown in FIG. 11. One or more of the operations shown in FIG. 11 may be performed by any of the exemplary systems described herein and/or any elements and/or implementations thereof.

In operation 1102, a system receives a request to initiate an activation process to activate a mobile wireless communication device on a mobile wireless communication network, such as described herein. In certain examples, the system receives the request by way of the mobile wireless communication device that is not currently activated on the mobile wireless communication network.

In operation 1104, the system authenticates the mobile wireless communication device to a user account associated with the mobile wireless communication network, such as described herein. For example, the system may receive and use an activation code and/or user login information to authenticate the mobile wireless communication device to the user account associated with the mobile wireless communication network, such as described herein.

In operation 1106, the system establishes an activation session between the authenticated mobile wireless communication device and the user account, such as described herein.

In operation 1108, the system provides, during the established activation session, an interactive activation flow by way of the authenticated mobile wireless communication device, such as described herein.

In operation 1110, the system activates the authenticated mobile wireless communication device on the mobile wireless communication network based on user interaction with the interactive activation flow by way of the authenticated mobile wireless communication device, such as described herein. Operation 1110 may include the system associated the activated mobile wireless communication device with the user account.

In certain embodiments, one or more of the processes, methods, and/or operations described herein may be implemented at least in part as instructions embodied in a non-transitory computer-readable medium and executable by one or more computing devices. In general, a physical processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 12:
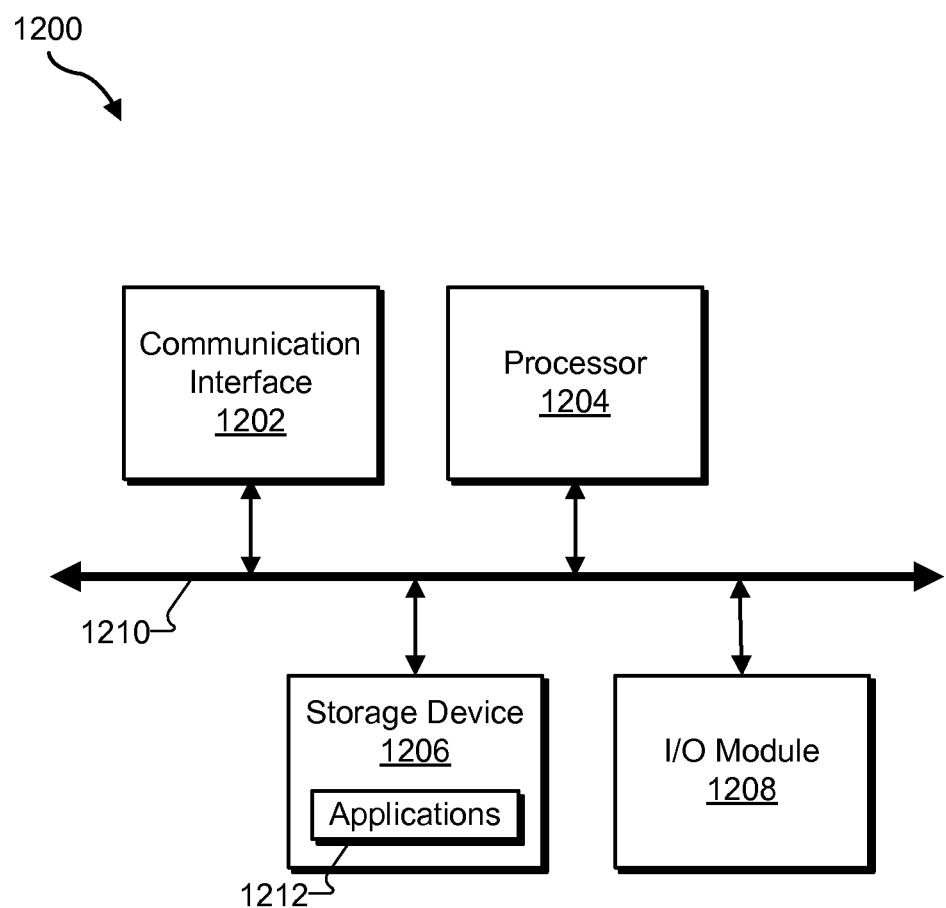
FIG. 12 illustrates an exemplary computing device according to principles described herein.

FIG. 12 illustrates an exemplary computing device 1200 that may be configured to perform one or more of the processes, methods, and/or operations described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional, fewer, or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, a radio transceiver for a mobile network, and any other suitable interface. In certain examples, communication interface 1202 is configured to send and receive signals over a mobile network.

Processor 1204 generally represents any type or form of processing unit (e.g., a physical processor) capable of processing data or interpreting, executing, and/or directing execution of one or more of the instructions, processes, and/or operations described herein. Processor 1204 may execute and/or direct execution of operations as directed by one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1206. For example, data representative of one or more applications 1212 configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., a radio frequency ("RF") or infrared receiver), and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or operations associated with activation management facility 102. Likewise, storage facility 104 may be implemented by or within storage device 1206. Such an implementation may be referred to as a computer-implemented system, such as a computer-implemented mobile wireless communication device activation system.

One or more of the systems, methods, elements, operations, features, tools, etc. described herein may improve operation and/or performance of computing device 1200, such as by conserving processing and/or memory resources of computing device 1200 and/or by providing for efficient operation of computing device 1200, for example.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a computer-implemented activation system and by way of a mobile wireless communication device not currently activated on a mobile wireless communication network, a request to initiate an activation process to activate the mobile wireless communication device on the mobile wireless communication network;
    authenticating, by the activation system, the mobile wireless communication device to a user account associated with the mobile wireless communication network;
    establishing, by the activation system, an activation session between the authenticated mobile wireless communication device and the user account;
    providing, by the activation system and during the activation session, an interactive activation flow by way of the authenticated mobile wireless communication device; and
    activating, by the activation system, the authenticated mobile wireless communication device on the mobile wireless communication network in association with the user account based on user interaction with the interactive activation flow by way of the authenticated mobile wireless communication device;
    wherein the authenticating of the mobile wireless communication device to the user account associated with the mobile wireless communication network comprises:
    prompting a user of the mobile wireless communication device to provide login information for the user account;
    receiving the login information for the user account; and
    verifying that the received login information for the user account matches login information on file for the user account.

2. The method of claim 1, wherein the receiving of the request to initiate the activation process to activate the mobile wireless communication device on the mobile wireless communication network comprises at least one of:
    receiving the request with a client application installed and executing on the mobile wireless communication device; and
    receiving, by an activation server system communicatively coupled to the mobile wireless communication device, data representative of the request from the mobile wireless communication device.

3. The method of claim 1, wherein the receiving of the request to initiate the activation process to activate the mobile wireless communication device on the mobile wireless communication network comprises an activation server system communicatively coupled to the mobile wireless communication device receiving data representative of the request from the mobile wireless communication device by way of the mobile wireless communication network on which the mobile wireless communication device is not currently activated.

4. The method of claim 1, wherein the establishing of the activation session between the authenticated mobile wireless communication device and the user account comprises providing the authenticated mobile wireless communication device with access to the user account.

5. The method of claim 1, embodied as computer-executable instructions on at least one non-transitory computer-readable medium.

6. A method comprising:
receiving, by a computer-implemented activation system and by way of a mobile wireless communication device not currently activated on a mobile wireless communication network, a request to initiate an activation process to activate the mobile wireless communication device on the mobile wireless communication network;
authenticating, by the activation system, the mobile wireless communication device to a user account associated with the mobile wireless communication network;
establishing, by the activation system, an activation session between the authenticated mobile wireless communication device and the user account;
providing, by the activation system and during the activation session, an interactive activation flow by way of the authenticated mobile wireless communication device; and
activating, by the activation system, the authenticated mobile wireless communication device on the mobile wireless communication network in association with the user account based on user interaction with the interactive activation flow by way of the authenticated mobile wireless communication device;
wherein the authenticating of the mobile wireless communication device to the user account associated with the mobile wireless communication network comprises:
prompting a user of the mobile wireless communication device to scan an activation code associated with a purchase of the mobile wireless communication device;
receiving an image of the activation code;
identifying, from the received image of the activation code, a user account identifier; and
identifying the user account by determining that the user account identifier identified from the received image matches a user account identifier on file for the user account.

7. The method of claim 6, wherein the authenticating of the mobile wireless communication device to the user account associated with the mobile wireless communication network further comprises:
prompting the user of the mobile wireless communication device to provide a password for the user account;
receiving data representative of the password for the user account; and
determining that the received password matches a password on file for the user account.

8. A method comprising:
receiving, by a computer-implemented activation system and by way of a mobile wireless communication device not currently activated on a mobile wireless communication network, a request to initiate an activation process to activate the mobile wireless communication device on the mobile wireless communication network;
authenticating, by the activation system, the mobile wireless communication device to a user account associated with the mobile wireless communication network;
establishing, by the activation system, an activation session between the authenticated mobile wireless communication device and the user account;
providing, by the activation system and during the activation session, an interactive activation flow by way of the authenticated mobile wireless communication device; and
activating, by the activation system, the authenticated mobile wireless communication device on the mobile wireless communication network in association with the user account based on user interaction with the interactive activation flow by way of the authenticated mobile wireless communication device;
wherein the authenticating of the mobile wireless communication device to the user account associated with the mobile wireless communication network comprises:
receiving at least one of a mobile device identifier and a subscriber identity module ("SIM") card identifier associated with the mobile wireless communication device from the mobile wireless communication device; and
associating the at least one of the mobile device identifier and the SIM card identifier with the user account.

9. A method comprising:
receiving, by a computer-implemented activation system and by way of a mobile wireless communication device not currently activated on a mobile wireless communication network, a request to initiate an activation process to activate the mobile wireless communication device on the mobile wireless communication network;
authenticating, by the activation system, the mobile wireless communication device to a user account associated with the mobile wireless communication network;
establishing, by the activation system, an activation session between the authenticated mobile wireless communication device and the user account;
providing, by the activation system and during the activation session, an interactive activation flow by way of the authenticated mobile wireless communication device; and
activating, by the activation system, the authenticated mobile wireless communication device on the mobile wireless communication network in association with the user account based on user interaction with the interactive activation flow by way of the authenticated mobile wireless communication device;
wherein the providing of the interactive activation flow by way of the authenticated mobile wireless communication device comprises:
providing a set of graphical user interface views for display by the authenticated mobile wireless communication device; and
receiving user input by way of the graphical user interface views, the user input representative of the user interaction with the interactive activation flow and one or more activation parameters selected by a user of the mobile wireless communication device.

10. The method of claim 9, wherein the set of graphical user interface views comprises a graphical user interface view that includes:
a first option selectable by the user of the mobile wireless communication device to upgrade a different mobile wireless communication device already activated on the user account to the mobile wireless communication device; and a second option selectable by the user to add the mobile wireless communication device as an additional activated device on the user account.

11. A system comprising:

at least one physical computing device that:

receives, by way of a mobile wireless communication device not currently activated on a mobile wireless communication network, a request to initiate an activation process to activate the mobile wireless communication device on the mobile wireless communication network;

authenticates the mobile wireless communication device to a user account associated with the mobile wireless communication network;

establishes an activation session between the authenticated mobile wireless communication device and the user account;

provides, during the activation session, an interactive activation flow by way of the authenticated mobile wireless communication device; and activates the authenticated mobile wireless communication device on the mobile wireless communication network in association with the user account based on user interaction with the interactive activation flow by way of the authenticated mobile wireless communication device;

wherein the at least one physical computing device authenticates the mobile wireless communication device to the user account associated with the mobile wireless communication network by:

prompting a user of the mobile wireless communication device to provide login information for the user account;

receiving the login information for the user account; and verifying that the received login information for the user account matches login information on file for the user account.

12. The system of claim 11, wherein the at least one physical computing device receives the request from the mobile wireless communication device with an activation gateway device communicatively coupled to the mobile wireless communication device by way of the mobile wireless communication network on which the mobile wireless communication device is not currently activated.

13. The system of claim 11, wherein the at least one physical computing device establishes the activation session between the authenticated mobile wireless communication device and the user account by providing the authenticated mobile wireless communication device with access to the user account.

14. The system of claim 11, wherein the at least one physical computing device provides the interactive activation flow by way of the authenticated mobile wireless communication device by:

providing a set of graphical user interface views for display by the authenticated mobile wireless communication device; and receiving user input by way of the graphical user interface views, the user input representative of the user interaction with the interactive activation flow and one or more activation parameters selected by a user of the mobile wireless communication device.

15. The system of claim 14, wherein the set of graphical user interface views comprises a graphical user interface view that includes:

a first option selectable by the user of the mobile wireless communication device to upgrade a different mobile wireless communication device already activated on the user account to the mobile wireless communication device; and a second option selectable by the user to add the mobile wireless communication device as an additional activated device on the user account.

16. The system of claim 11, wherein the activation server system establishes the activation session between the authenticated mobile wireless communication device and the user account by providing the authenticated mobile wireless communication device with access to the user account.

17. A system comprising:

a client application installed on a mobile wireless communication device not activated on a mobile wireless communication network, the client application configured to direct the mobile wireless communication device to request an activation of the mobile wireless communication device on the mobile wireless communication network; and an activation server system that includes at least one physical computing device, is communicatively coupled to the mobile wireless communication device, and that:

receives, from the mobile wireless communication device not activated on the mobile wireless communication network, a request to initiate an activation process to activate the mobile wireless communication device on the mobile wireless communication network;

authenticates the mobile wireless communication device to a user account associated with the mobile wireless communication network;

establishes an activation session between the authenticated mobile wireless communication device and the user account;

provides, during the activation session and based on the user account, an interactive activation flow by way of the authenticated mobile wireless communication device; and activates the authenticated mobile wireless communication device on the mobile wireless communication network based on user interaction with the interactive activation flow by way of the authenticated mobile wireless communication device;

wherein the activation server system authenticates the mobile wireless communication device to the user account associated with the mobile wireless communication network by:

prompting a user of the mobile wireless communication device to provide login information for the user account;

receiving the login information for the user account; and verifying that the received login information for the user account matches login information on file for the user account.

18. The system of claim 17, wherein the activation server system receives the request to initiate the activation process to activate the mobile wireless communication device on the mobile wireless communication network from the mobile wireless communication device over the mobile wireless communication network.

19. The system of claim 17, wherein the activation server system provides the interactive activation flow by way of the authenticated mobile wireless communication device by:
   providing a set of graphical user interface views for display by the authenticated mobile wireless communication device; and
   receiving user input by way of the graphical user interface views, the user input representative of the user interaction with the interactive activation flow and one or more activation parameters selected by a user of the mobile wireless communication device.

20. The system of claim 19, wherein the set of graphical user interface views comprises a graphical user interface view that includes:
   a first option selectable by the user of the mobile wireless communication device to upgrade a different mobile wireless communication device already activated on the user account to the mobile wireless communication device; and
   a second option selectable by the user to add the mobile wireless communication device as an additional activated device on the user account.

* * * * *